United States Patent
Huang et al.

(10) Patent No.: US 6,490,017 B1
(45) Date of Patent: *Dec. 3, 2002

(54) SEPARATING WHITE LIGHT INTO POLARIZED, COLORED LIGHT

(75) Inventors: Austin L. Huang, Arlington, TX (US); Richard M. Knox, Houston, TX (US)

(73) Assignee: Duke University, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/238,713

(22) Filed: Jan. 28, 1999

(Under 37 CFR 1.47)

(51) Int. Cl.[7] .................. G02F 1/1335; G03B 21/00; G02B 5/30
(52) U.S. Cl. .............. 349/97; 359/495; 353/31
(58) Field of Search .............. 349/96, 74, 97, 349/100, 117, 119, 5; 359/495; 353/31–34

(56) References Cited

U.S. PATENT DOCUMENTS

| | | | |
|---|---|---|---|
| 5,122,887 A | * 6/1992 | Mathewson | 349/74 |
| 5,404,076 A | 4/1995 | Dolan et al. | 162/242 |
| 5,571,384 A | 11/1996 | Pikka et al. | 313/637 |
| 5,606,220 A | 2/1997 | Dolan et al. | 316/637 |
| 5,627,666 A | * 5/1997 | Sharp et al. | 349/74 |
| 5,686,931 A | 11/1997 | Fünfschilling et al. | 349/97 |
| 5,833,360 A | 11/1998 | Knox et al. | 362/293 |
| 5,999,240 A | * 12/1999 | Sharp et al. | 349/119 |
| 6,217,174 B1 | * 4/2001 | Knox | 353/31 |

FOREIGN PATENT DOCUMENTS

| WO | WO96/37806 | 11/1996 |
|---|---|---|
| WO | WO97/43862 | 11/1997 |

* cited by examiner

Primary Examiner—Toan Ton
Assistant Examiner—Dung Nguyen
(74) Attorney, Agent, or Firm—Myers Bigel Sibley & Sajovec

(57) ABSTRACT

An electro-optic shutter is provided that includes first and second liquid crystal devices located along an optical path and first and second color-selective layers located between the first and second liquid crystal devices. Each liquid crystal device is adapted to rotate the polarization of incident light to a substantially orthogonal polarization in response to being in a first state, and to not substantially change the polarization of incident light in response to being in a second state. The first color-selective layer is adapted to transmit first and second colors and a first polarization of a third color. The second color-selective layer is adapted to transmit the first and the third colors and a second polarization of the second color that is substantially orthogonal to the first polarization. An electro-optic shutter is also provided that includes a color-selective layer, a liquid crystal device to receive light from the color-selective layer and a polarizer to receive light from the liquid crystal layer. The color-selective layer is adapted to transmit a first color, a first polarization of a second color, and a substantially orthogonal polarization of a third color. The liquid crystal device is adapted to rotate the polarization of light to a substantially orthogonal polarization when in a first state and to not substantially rotate the polarization of light when in a second state. The electro-optic shutter can be employed in projection systems.

67 Claims, 12 Drawing Sheets

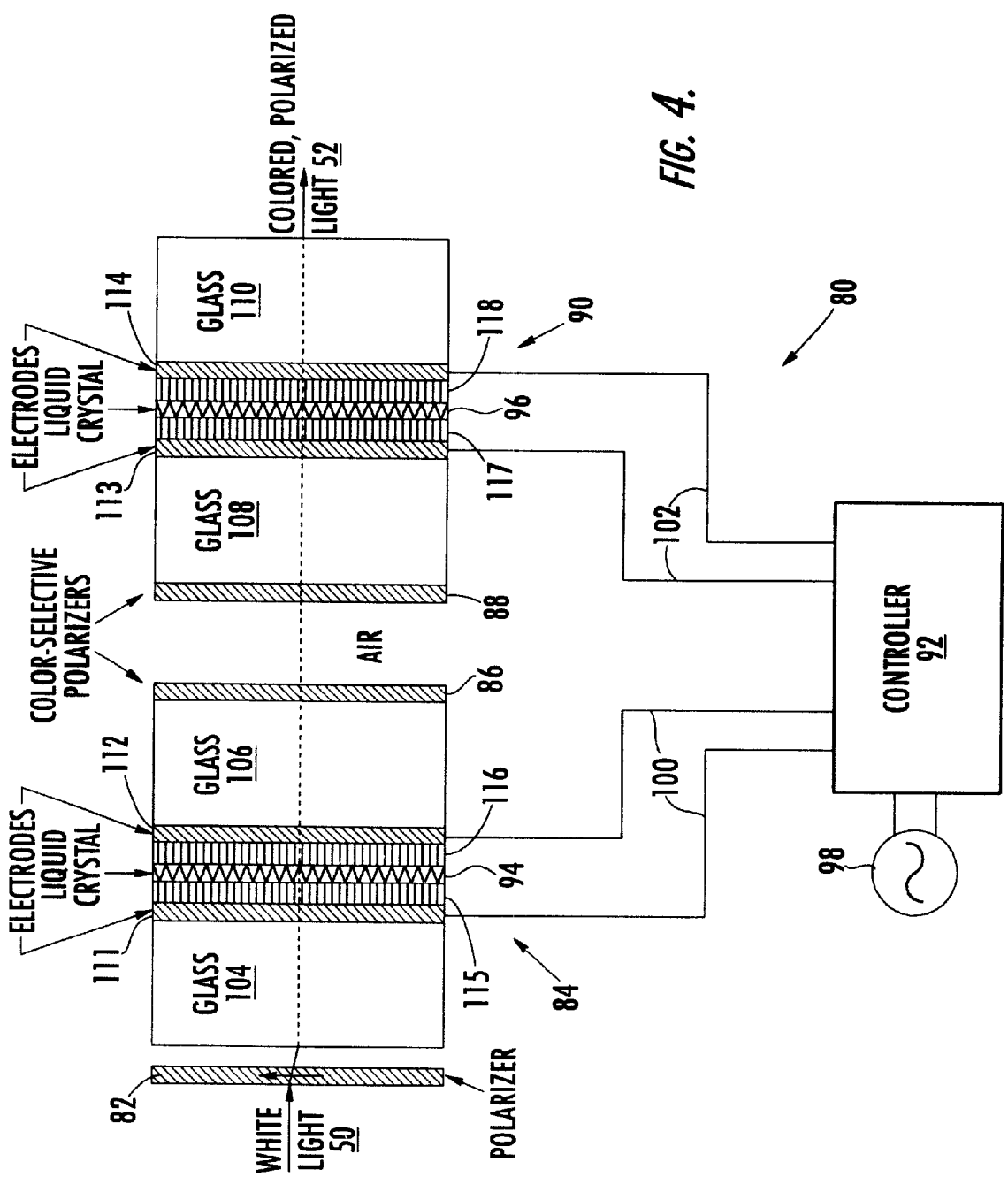

SEPARATING WHITE LIGHT INTO POLARIZED, COLORED LIGHT

BACKGROUND OF THE INVENTION

1. Field of the Invention

The present invention relates generally to electro-optical shutter devices, and more specifically, to methods and apparatus for separating white light into packets of polarized, colored light.

2. Description of the Related Art

FIG. 1 illustrates a cross prism or cube 10 having four component prisms 32, 34, 36, 38 that fit together to give the cubic form to the cross cube 10. The cross cube 10 is an optical device that produces colored light beams 12, 14, 16 from a white light beam 18. The white light beam 18 enters the cross cube 10 through a front face 20 and the beams of red, green, and blue light 12, 14, 16 exit the cross cube 10 through the side faces 22, 24, 26. First and second color-selective layers 28, 30 give the cross cube 10 the above-described color-separating properties. The first and second layers, 28, 30 are deposited along the joints or interfaces between the four components 32, 34, 36, and 38.

The selective reflectivities of the first and second layer 28, 30 give the color-separating properties to the cross cube 10. The first layer 28 substantially reflects only red light in a first direction. The second layer 30 substantially reflects only blue light in a direction that is opposite to the first direction. Green light passes through the cross cube 10 without either a substantial reduction in intensity or a substantial deviation in direction. To use the cross cube 10 in three-color image formation, three imagers (not shown) are generally necessary, i.e. one imager for each of the separate red, green, and blue light beams 12, 14, 16. The outgoing red, green, and blue light beams 12, 14, 16 have substantially the same power per wavelength as the red, green, and blue components of the incoming white light beam 18.

Referring to FIG. 1, the source (not shown) of the white light beam 18 may be deficient in certain color or wavelength ranges. For example, metal halide lamps are deficient in red or long wavelength visible light. Such lamps output "quasi"-white light, i.e., a white light in which one or more color components are substantially less intense than other by components. If a metal halide lamp is used with the cross cube 10 to produce the colored light beams 12, 14, 16, the red light beam 12 would be substantially less intense than the other two colored light beams 14, 16. Similarly, a sodium lamp is deficient in blue or short wavelength visible light. Therefore, using the cross cube 10 to separate quasi-white light 18 from a sodium lamp would produce the three colored light beams 12, 14, 16, but the beam of blue light 16 would be substantially less intense than the other two colored light beams 12, 14. In devices (not shown) that use the colored light beams 12, 14, 16 for color image formation, it is generally advantageous for the different colored light beams 12, 14, 16 to have photopically weighted intensities. Unfortunately, the simple cross prism 10 does not normally produce colored light beams of weighted intensity when the white light source is deficient in a particular wavelength or color range.

The present invention is directed to overcoming, or at least reducing the effects of, one or more of the problems set forth above.

SUMMARY OF THE INVENTION

In another aspect, embodiments of the invention feature an electro-optic shutter. The electro-optic shutter includes a color-selective layer, a liquid crystal device to receive light from the color-selective layer and a polarizer to receive light from the liquid crystal layer. The color-selective layer is adapted to transmit a first color, a first polarization of a second color, and a substantially orthogonal polarization of a third color. The liquid crystal device is adapted to rotate the polarization of light to a substantially orthogonal polarization when in a first state and to not substantially rotate the polarization of light when in a second state.

BRIEF DESCRIPTION OF THE DRAWINGS

Other objects and advantages of the invention will become apparent upon reading the following detailed description and upon reference to the drawings in which:

FIG. 4 illustrates the electro-optic shutter in FIG. 2 in accordance with a first embodiment of the invention;

Figure 1:
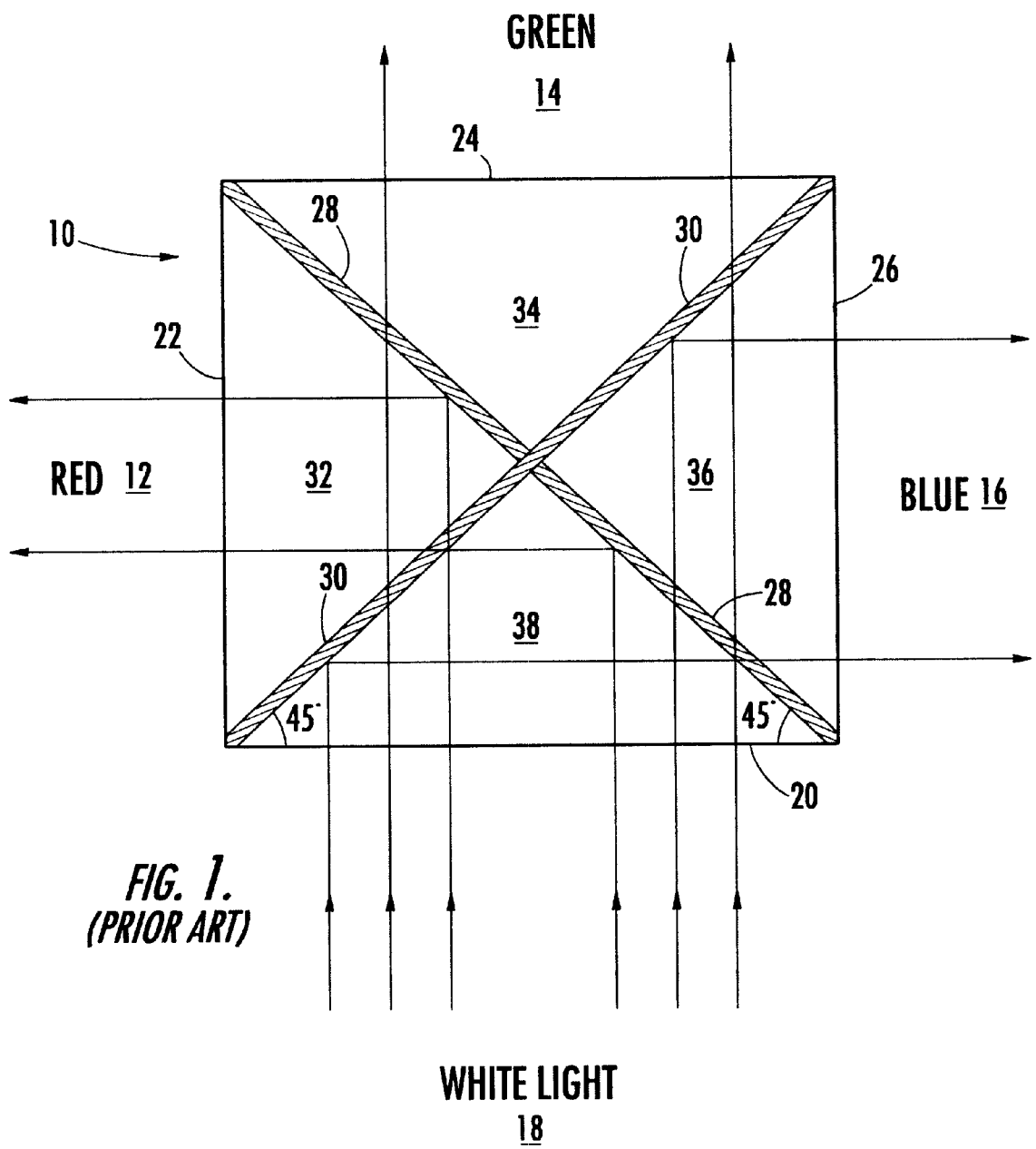
FIG. 1 illustrates a cross cube from the prior art.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Specific embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
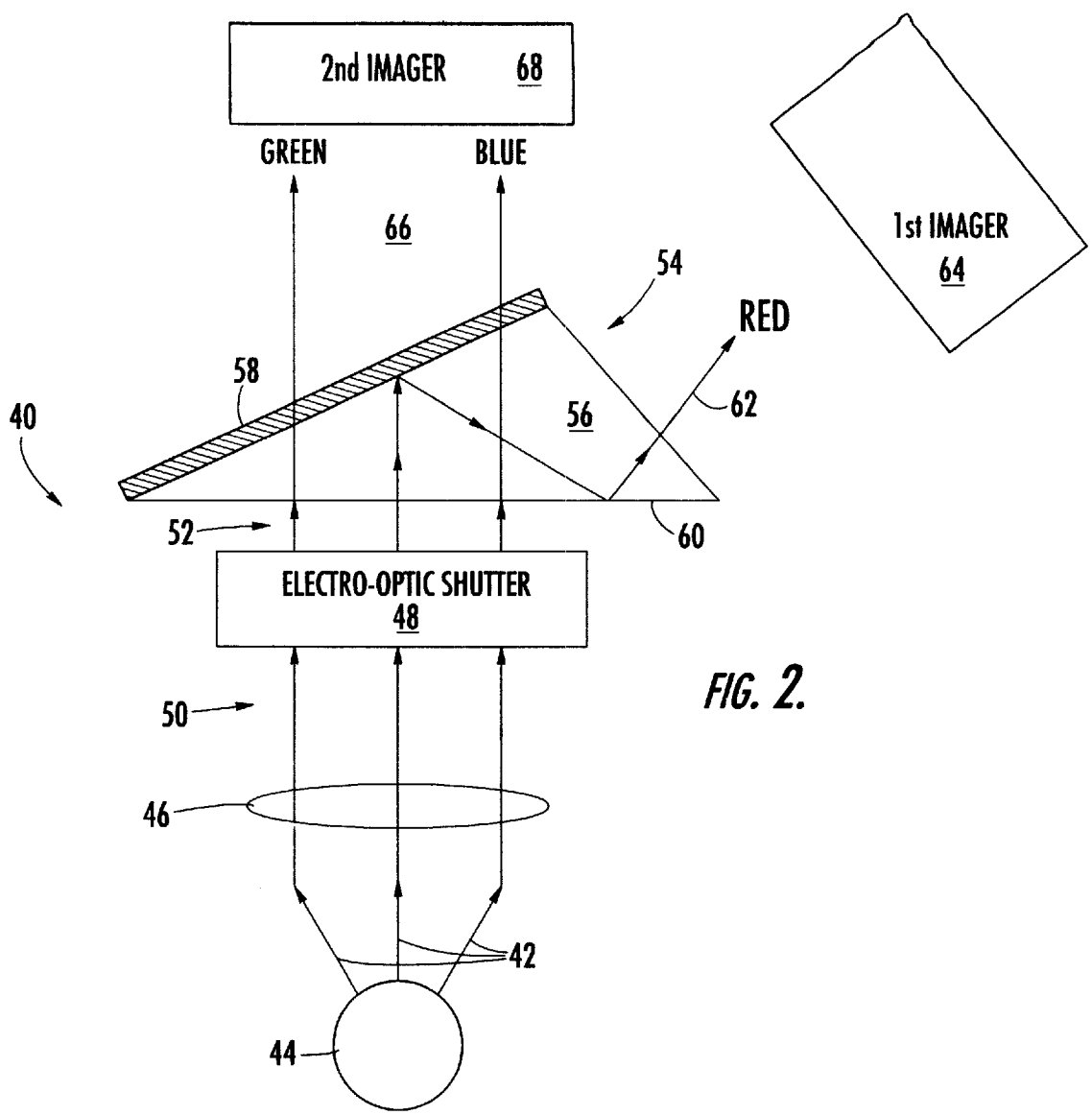
FIG. 2 illustrates an electro-optic system for separating quasi-white light into beams of colored light having more equal intensities in accordance with an embodiment of the invention.

FIG. 2 illustrates an electro-optic system 40 for producing colored light beams of more equal intensity compared to colored components of quasi-white light. The electro-optic system 40 may be a cost-reduced system compared to other electro-optic systems. A light source 44 produces a quasi-white light beam 42 that is deficient in a particular wavelength range. The light source 44 in the embodiments described below produces quasi-white light, having an intensity in the red-wavelength range that is about half the intensity in both the blue and the green wavelength ranges, i.e. a red-deficient light source. The present invention is however, intended to include quasi-white light sources deficient in other color or wavelength ranges in other embodiments. An ordinary person in the art would be able to construct such embodiments without undue experimentation in light of the present disclosure.

Referring to FIG. 2, the quasi-white light beam 42 passes through a collecting (e.g., a collimating) lens or system of lenses 46 and enters into an electro-optic shutter 48 as the incoming light beam 50. In alternative embodiments, a solid optic, such as a tapered light guide operating by total internal reflection (TIR), or another light pipe, can instead be inserted between the light source 44 and the electro-optic shutter 48 (e.g., bonded to the electro-optic shutter 48 to help avoid or reduce interface or insertion loss) or between the light source 44 and the collimating lens or system of lenses 46. The electro-optic shutter 48 is electrically addressable and in some embodiments: (1) it may have smaller mechanical packaging compared to mechanical shutters; (2) its operation does not depend on it being a movable device; (3) it may be optically bonded to improve light throughput; (4) it may have adjustable colored light duty cycle when bi-stable or binary LCDs (e.g., FLCDs that use pulse width modulation) are employed; (5) it can be turned on to produce different colored light intensities of dynamic color balancing of different colors, or for compensation of unequal colored light output from light sources that employ analog LCDs, or for aging that might cause a color shift; or (6) it may be used as a brightness control, for example, by raising or lowering all color levels together via voltage adjustment. The electro-optic shutter 48 can operate as a graphic equalizer for different frequency light, each color band controllable to a particular level and/or position in time (e.g., in a sequential color system). Some color bands could be transmitted through the electro-optic shutter 48 all the time and others in some sequence, as will be discussed below. One application of such control could be provided when multiple computer monitors or televisions ("displays") are placed adjacent to each other for purposes of tiling images. An optical connection could be provided between the adjacent displays (e.g., using optical fiber) to sample each neighbor's colors to very closely color match the displays. The light sources of the displays would be sampled to compensate for any variations between the displays, such as variances in lamp color, by setting levels of the colors (e.g., sequenced colors) with applied voltages.

The electro-optic shutter 48 toggles or alternates the wavelengths of the incoming light beam 50 and produces outgoing light beam 52 in which the time-averaged intensity of red, green, and blue light can be substantially equal. The outgoing light beam 52 enters a color-separating prism 54, e.g., a modified Philips prism in FIG. 2. The prism 54 includes a glass wedge 56 and a layer of (e.g., thin-film) dichroic material 58 that selectively reflects light in a red wavelength range. The red wavelengths of the light beam 52 are reflected by a color-selective layer 58 and then totally internally reflected by a front surface 60 of the glass wedge 56, thereby forming an outgoing beam of red light 62 directed towards a first imager 64 (e.g., an LCD).

Green and blue wavelengths in the beam 52 pass through an end cap 65 (e.g., a glass end cap) and are substantially undeviated by the color-selective layer 58, and form an outgoing beam 66 of colored light incident on a second imager 68. The end cap 65 can help reduce optical aberrations and is used to match the optical path lengths between the green and blue outgoing beam 66 and the red light beam 62 so that the first imager 64 can be converged with a red image. The electro-optic shutter 48 toggles or temporally switches between color components of the incoming quasi-white light 50, so that at any particular time, the outgoing beam 66 either contains blue or green wavelength components (i.e., $\lambda_1$ or $\lambda_2$), but not both, while the third beam 62 contains the red wavelength component (i.e., $\lambda_3$). Thus, the electro-optic system 40 performs two imager color sequencing with the first and second imagers 64, 68 and the beams 62, 66. In other embodiments, the electro-optic shutter 48 could instead be a three (or more) color sequencer or shutter, as will be appreciated by those skilled in the art. With a three color shutter, a single imager or spatial light modulator (SLM) could be used instead of two imagers, and a mechanical shutter might. be used as a color shutter, if fast enough, with input light already polarized (e.g., from a polarized light source).

Figure 3:
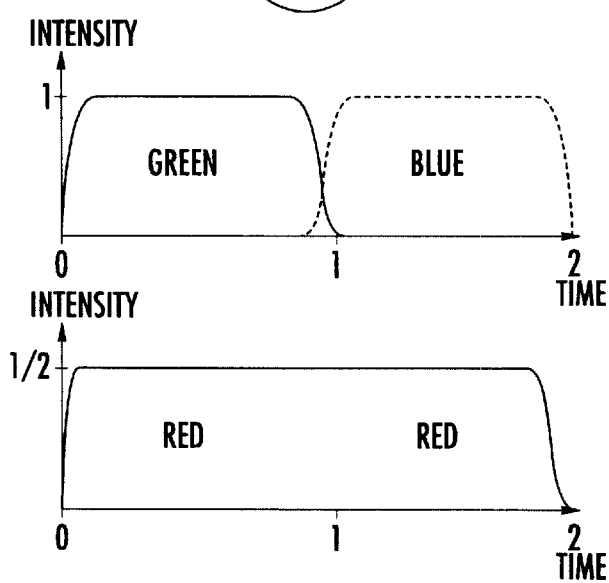
FIG. 3 illustrates how the electro-optic shutter in FIG. 2 toggles the colors in the incoming light beam to produce more equal intensity beams of red, blue, and green light.

FIG. 3 illustrates the color toggling or sequencing action of the electro-optic shutter 48 in FIG. 2, as mentioned above. In this embodiment, it is assumed for illustrative purposes that the quasi-white light source 44 is red-deficient and produces approximately half as much light at red wavelengths as at green or blue wavelengths, and substantially equal amounts of light at green and blue wavelengths. Other embodiments would include the source 44 producing other proportions of red, green, and blue light. The electro-optic shutter 48 in FIG. 2 temporally toggles or sequences two colors of light (e.g., the green and blue components of light) so that in a first time period substantially all the red and green wavelengths in the incoming light beam 50 are transmitted to the outgoing light beam 52. As shown in FIG. 3 for two imager color sequencing, during the first time period, the electro-optic shutter 48 does not substantially transmit the blue component light in the incoming light beam 50. In a second time period, the electro-optic shutter 48 transmits substantially all the red and blue wavelengths in the incoming light beam 50 to the outgoing light beam 52. During the second time period, the electro-optic shutter 48 does not substantially transmit the green wavelengths in the incoming light beam 50 to the outgoing light beam 52. The electro-optic shutter augments the intensity at red wavelengths with respect to the intensity at green and blue wavelengths, for the red-deficient light source 44, by time toggling the more intense green and blue components during portions of the total illumination period for the red wavelengths. The electro-optic shutter 48 is adapted to time toggle different colors of the incoming light beam 50 to more equalize the time averaged intensities of the different colors in the outgoing light beam 52.

The electro-optic shutter 48 is also adapted to time toggle different colors of the incoming light beam 50 so that the time averaged intensity of one or more colors is increased in the outgoing light beam 52. By increasing the intensity of red components, three color imagers may be able to perform more rapid scans and/or produce higher resolution in the red component of a three color image.

The length of the toggled first and second time periods in FIG. 3 is limited to a certain extent by the switching frequencies obtainable with the electro-optic shutter 48. In embodiments of the electro-optic shutter 48 employing ferroelectric liquid crystals and nematic liquid crystals, maximum switching frequencies are about 10–100 KHz and about 200 Hz, respectively. The present invention is intended to include embodiments that employ any optically active liquid crystal, LED, or laser technologies for imagers.

FIG. 4 illustrates a first embodiment 80 of the electro-optic shutter 48 in FIG. 2. Other embodiments of the electro-optic shutter (i.e., other two-color sequencers or other number-color sequencers) could be envisioned, as will be appreciate by those skilled in the art with the benefit of the present disclosure. From the incoming quasi-white light beam 50, the electro-optic shutter 80 produces the outgoing light beam 52, which is polarized and colored. The incoming quasi-white light 50 passes through a linear polarizer 82. From the polarizer 82, the linearly polarized light enters a first liquid crystal device 84. Then the light passes through first and second color-selective layers 86, 88 and enters a second liquid crystal device 90. The second liquid crystal device 90 outputs the outgoing colored and polarized light beam 52. The first and second liquid crystal devices 84, 90 are sandwich-type structures containing liquid crystal layers 94, 96. The first and second liquid crystal devices 84, 90 are electrically operated by a controller 92. The controller 92 toggles the colors in the outgoing light beam 52 by applying a voltage of a source 98 across one or both of the liquid crystal layers 94, 96.

Referring to FIG. 4, the controller 92 changes the optical properties of the liquid crystal devices 84, 90 by applying the voltage across the liquid crystal layers 94, 96 via lines 100, 102. Each liquid crystal device 84, 90 is rigidly confined between pairs of glass plates 104, 106 and 108, 110. The glass plates 104, 106, 108, 110 provide structural rigidity to the first and second liquid crystal devices 84, 90. Pairs of transparent electrodes 111, 112 and 113, 114 are deposited on the interior surfaces of each pair of glass plates 104, 106 and 108, 110. In one embodiment, the transparent electrodes 111, 112, 113, 114 are constructed with a layer of a transparent electrically conductive layer, for example, indium tin oxide (ITO). Each transparent electrode 111, 112, 113, 114 is in contact with a corresponding transparent polymer layer 115, 116, 117, 118. In one embodiment, the polymer layers 115, 116, 117, 118 consist of polyimide. Each pair of polymer layers 115, 116 and 117, 118 serves to confine and isolate one of the liquid crystal layers 94, 96 from other structures of the corresponding liquid crystal device 84, 90. The layers 115, 116 and 117, 118 act to align the molecular liquid crystals to get a proper polarization effect (i.e., "anchors" the molecules to a specific orientation). In the various embodiments, the controller 92 may apply a voltage to one, both or neither of the liquid crystal devices 84 and 90 at any particular time.

Referring to FIG. 4, the two liquid crystal layers 94, 96 and the color-selective layers 86, 88 are optical devices that can exhibit birefringence. The first and second liquid crystal devices 84, 90 and the layers 94, 96 have two voltage-controlled states, a "FIRST" state and a "SECOND" state. In the SECOND state, each of the liquid crystal layers 94, 96 is birefringent and behaves approximately as a ½-wave plate (typically when power is applied to the layers 94 or 96), i.e., a layer that rotates the polarization of incoming light of a selected wavelength or color range by 90°. In some embodiments, the liquid crystal layers 94, 96 are constructed with liquid crystals selected from the group consisting of ferroelectric liquid crystals (FLCs) and nematic liquid crystals. FLCs that can be used for the layers 94, 96 include bi-stable materials and materials used for analog devices. The layers 94, 96 can also be other analog liquid crystal materials as well as other types of liquid crystals that are bistable or multi-state and the like. All these liquid crystal materials behave as a ½-wave plate or approximately a ½-wave plate device. Since the incoming white light 50 contains several selected wavelengths or color ranges, e.g., red, green, and blue wavelength ranges, the first and second liquid crystal layers 94, 96 only approximately or completely rotate the polarization of each of the selected wavelength ranges by 90° when in the SECOND state. The precise rotation has a small wavelength dependence. In the FIRST state (typically when power is not applied to the layers 94 or 96), the liquid crystal layers 94, 96 are not birefringent, i.e., the liquid crystal layers 94, 96 do not (or minimally) rotate the polarization of the incoming light 50.

The first and second color-selective layers 86, 88 transmit selected colors and polarizations of light. For example, the first color-selective layer 86 transmits both polarizations of light in the red and green wavelength range and transmits blue light that is polarized perpendicularly to the polarizing direction of the polarizer 82. An internal optical direction of the first color-selective layer 86 is aligned with the polarization direction of the polarizer 82 to correlate the polarization selectivity of both devices. Similarly, the second color-selected layer 88 transmits both polarizations of light in the red and blue wavelength ranges. The color-selective layer 88 transmits the light in the green wavelength range that is polarized parallel to the polarizing direction of the polarizer 82. An internal optical direction of the second color-selective layer 88 is aligned with the polarizing direction of the polarizer 82 to correlate the polarization selectivity of both devices. The color-selective layers 86, 88 reflect or absorb substantially all visible light of polarizations in wavelength ranges that are not transmitted, depending on the type of material of which the layers 86, 88 are constructed. For example, the layers 86, 88 can each be designed to affect the polarization state of one color of light input to the layers 86, 88 and not others. The layers 86, 88 each include a retardance layer (e.g., color or wavelength selective half-wave or odd multiple half-wave) and a separate polarizer or a retardance layer/polarizer layer combination. The polarizer layer portions can be absorptive or reflecting polarizers (e.g., reflecting linear polarizers). In some embodiments, the retardance and polarizer layers that form the color-selective layers 86, 88 are layered adjacent to each other while in other embodiments they are separated layers not necessarily adjacent to each other (i.e., a separate retarder and polarizer). In yet other embodiments, the color-selective layers 86, 88 include retardance layers and do not include polarizers, for example, because the input light 50 is already polarized by the polarizer 82. In these embodiments, an output polarizer, as will be described below, is used as an analyzer.

The color-selective layers 86, 88 can be similar to filters described in U.S. Pat. No. 5,571,384, entitled "Color Polarizers for Polarizing an Additive Color Spectrum Along a First Axis and its Complement Along a Second Axis," issued to Sharp, and in International Applications Published Under the Patent Cooperation Treaty (PCT) Nos. PCT/US07527, filed May 23, 1996, by Sharp, entitled "Color Polarizers," International Publication No. WO 96/37806, published Nov. 28, 1996 and PCT/US97/08290, filed May 14, 1997, by Johnson and Sharp, entitled "Color Selective Light Modulators," International Publication No. WO 97/43862, published Nov. 20, 1997, all of which are incorporated by reference herein in their entirety.

The polarizer 82 may be a standard absorptive linear polarizer (e.g., a die polarizer). However, in accordance with alternative embodiments of the invention, the polarizer 82 can instead be a reflecting linear polarizer, i.e., a substantially nonabsorptive polarizer. Any light from the light source 44 in the wrong polarization or color (e.g., not polarized in the direction of polarization of the polarizer 82 in FIG. 4) will be reflected by the reflecting polarizer 82 back toward the light source 44. This could also occur if the polarizer 82 is an absorptive polarizer and portions of the light in wavelength ranges not transmitted by the color-selective layers 86, 88, as discussed above, manage to pass through the polarizer 82 back toward the light source 44 after being reflected by other components of the electro-optic system 40. Whether reflected by a reflecting polarizer 82 or passing through an absorptive polarizer 82 on its way back toward the light source 44, depending on the design of the color-selective layers 86, 88, this unwanted light—in certain embodiments of the electro-optic shutter 80 that are bidirectional for this unwanted light—can be used to "optically pump" certain types of light sources that may be used for the light source 44. Examples of such light sources are disclosed in prior, co-owned U.S. patent application Ser. No. 08/747,190, filed Nov. 12, 1996, entitled "High Efficiency Lamp Apparatus for Producing a Beam Polarized Light," which is incorporated by reference herein in its entirety. These light sources are also similar to light sources disclosed in U.S. Pat. No. 5,404,076, entitled "Lamp Including Sulfur" and U.S. Pat. No. 5,606,220, entitled "Visible Lamp Including Selenium or Sulfur," both issued to Dolan et al. and incorporated by reference herein in their entirety. Optical pumping with a reflecting polarizer is possible whether the system 40 were a one, two, three, etc. color sequencer system.

The color-selective layers 86, 88, when their polarizer portions are reflecting polarizers, and the polarizer 82, when a reflecting polarizer, may be constructed with a McNeil polarizer, a dichroic stack coating (e.g., on glass) polarizer, multilayer optical film (MOF), or with another wide angle reflecting polarizer. MOF and these other polarizers are types of substantially nonabsorbing, reflecting linear polarizers. Double brightness enhancement film (DBEF) is a variety of MOF, commercially available from 3M Company. MOF has an intrinsic optical axis that may be aligned to transmit substantially one (the wanted) polarization and to reflect substantially all (the unwanted) light of an orthogonal polarization. For example, for the polarizer 82, the one (wanted) polarization of the light 50 is transmitted to the first liquid crystal device 84 and the unwanted portion is reflected back toward the light source 44. The reflecting polarizer 82 can be inclined at other angles with corresponding adjustments to the remaining optics so that substantially one polarization is reflected and the orthogonal polarization is transmitted. The same is true for the color-selective layers 86, 88 when their polarizer portions are reflecting polarizers.

In addition to possible use for optical pumping, in certain embodiments of the electro-optic shutter 80, depending on the design of the color-selective layers 86, 88, substantially nonabsorbing, reflecting polarizers may be used as the polarizer 82 and/or as the polarizer portions of the color-selective layers 86, 88. These nonabsorbing, reflecting polarizers may advantageously help prevent or reduce the possible occurrence of detrimental thermal effects in the electro-optic system 40, if the light source 44 is a high power light source. This is possible because the substantially nonabsorbing, reflecting polarizers do not substantially absorb the unwanted light and instead direct it back to the light source 44. The system 40, whether a one, two, three, etc. color sequencer system, thus can prevent or reduce thermal effects with one or more reflecting polarizers. Thus, the use of reflecting polarizers for the polarizer 82 and for the polarizer portions of the color-selection polarizers 86, 88 may preclude any need for absorptive polarizers in the system 40.

Figure 5A:
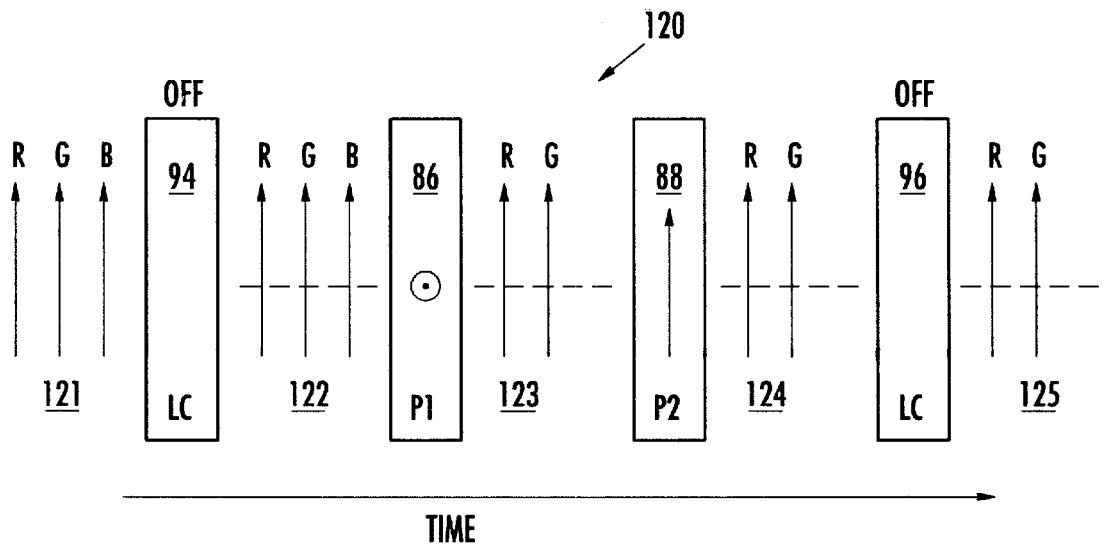
FIGS. 5A–5D illustrates the color-separating properties of the electro-optic shutter in FIG. 4.

Referring now to FIG. 5A, an optional output polarizer 99, which can function as a final analyzer, is shown. The polarizer 99 can be an absorptive or a reflecting polarizer like the input polarizer 82. The polarizer 99 can be constructed of MOF if it is a reflecting polarizer, and function to help optically pump and/or to help reduce detrimental thermal effects, as described above.

In FIG. 5A, an optical path 120 of the electro-optic shutter 80 in FIG. 4 is illustrated when the first or the second liquid crystal devices 84, 90 are both in the FIRST state, i.e. no voltage is applied. In the input region 121 of the optical path 120, polarized red, green, and blue light enters the optical path 120 polarized by the polarizer 82 in FIG. 4. Since the first liquid crystal layer 94 is in the FIRST state, the light from the region 121 is transmitted to the second region 122 without (or with minimal) polarization rotation. Since the first color-selective layer 86 transmits only red and green light having the initial polarization of the light in the input region 121, the third region 123 in the optical path 120 receives only red and green light having the initial polarization. The blue light in the initial polarization state is not transmitted by the color-selective layer 86. Since the second color-selective layer 88 transmits all colors of light having the initial polarization, the fourth region 124 in the optical path 120 receives only red and green light having the initial polarization. The second liquid crystal layer 96, being in the FIRST state, does not rotate (or minimally rotates) light polarization, and the region 125 receives the available red and green light, having the initial polarization of the light in the input region 121. If the output polarizer 99 is not used, then the region 125 is the output region. Otherwise, the region 125A is the output region.

Figure 5B:
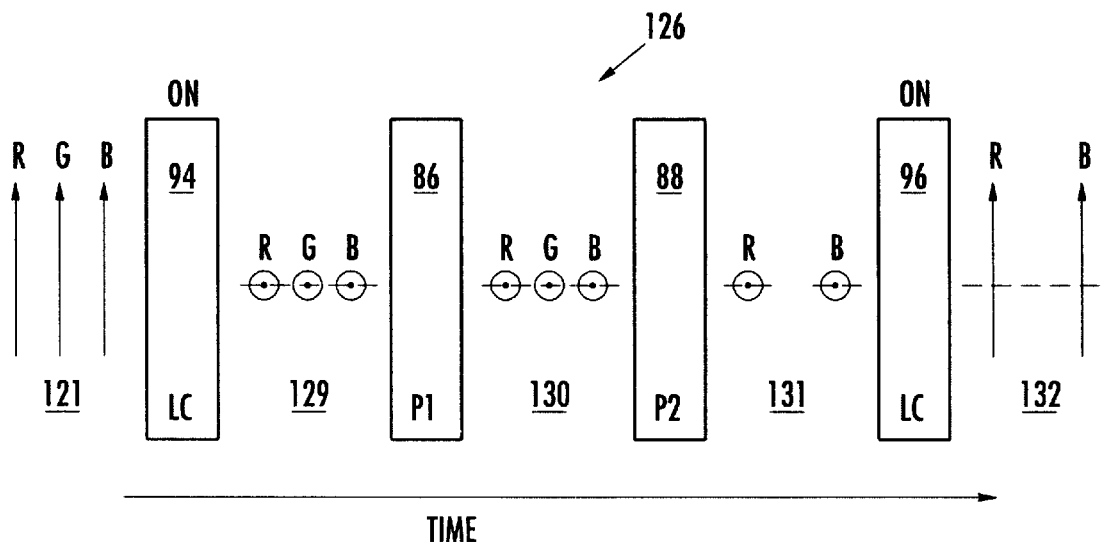

FIG. 5B illustrates an optical path 126 of the electro-optic shutter 80 in FIG. 4 when the first and second liquid crystal devices 84, 90 are both in the SECOND state. In the input region 121, linearly polarized incident red, green, and blue light enters the optical path 126. Because the first liquid crystal layer 94 is in the SECOND state, the polarization of all light entering into the second region 129 is rotated. The second region 129 receives the red, green, and blue light with polarization rotated by about 90°, i.e. orthogonal to the incident polarization. The first color-selective layer 86 transmits substantially all the input light with a polarization rotated by about 90°. Therefore, all three colors red, green, and blue enter the third region 130 with the approximately 90° rotated polarization. The second color-selective layer 88 only transmits red or blue light, having the approximately 90° rotated polarization, into the fourth region 131. Since the second liquid crystal layer 96 is in the SECOND state, the second liquid crystal layer 96 rotates the polarization of light incident thereon by approximately 90°. Then, the region 132 of the optical path 126 receives the red and blue light in the initial polarization state of the light in the input region 121. The red and blue light in the initial polarization state then pass through the optional polarizer 99, if used, to the region 132A. The region 132A is the output region if the polarizer 99 is used. Otherwise, the output region is the region 132.

Figure 5C:
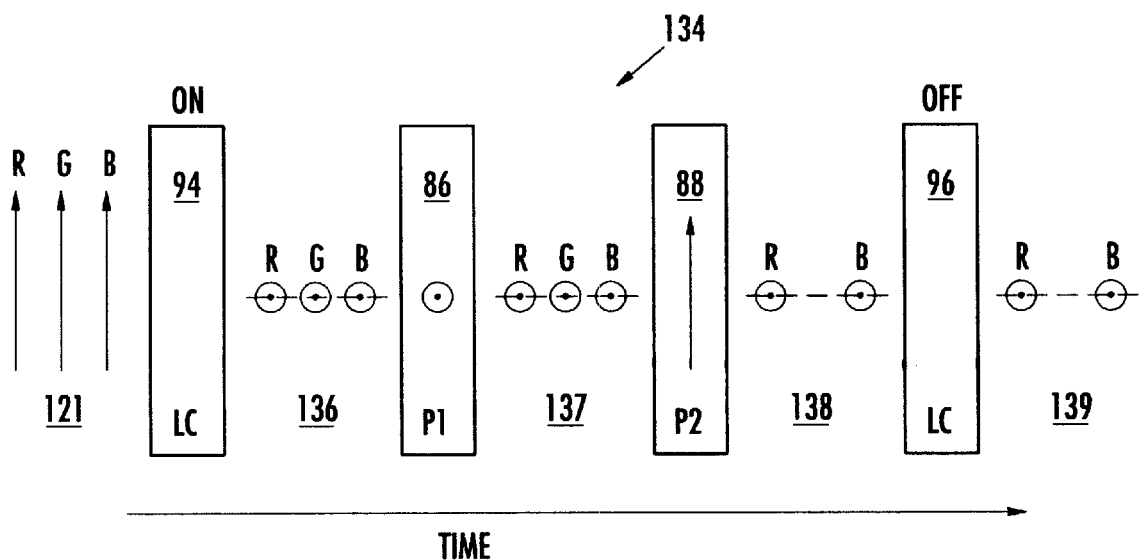

FIG. 5C illustrates an optical path 134 of the electro-optic shutter 80 when the first liquid crystal device 84 is in the SECOND state and the second liquid crystal device 90 is in the FIRST state. Linearly polarized red, green and blue light enters in the input region 121. Since the first liquid crystal layer 94 is in the SECOND state, the polarization of all the light incident thereon is rotated. Thus, the second region 136 in the optical path 134 receives light of all three colors with the polarization rotated by about 90°. The first color-selective layer 86 transmits substantially all light having the rotated polarization. Thus, the third region 137 receives light in red, green, and blue colors polarized substantially orthogonal to the polarization of the light in the input region 121. The second color-selective layer 88 transmits substantially all red and blue light with the rotated polarization and reflects substantially all green light having the rotated polarization. Thus, the fourth region 138 receives the red and blue light with the rotated or orthogonal polarization. Since the second liquid crystal layer 96 is in the FIRST state, it does not substantially rotate the polarization of light incident thereon. Therefore, the region 139 of the optical path 134 receives red and blue light having a polarization rotated by approximately 90° with respect to the initial polarization in the light in the input region 121, followed by the region 139A if the polarizer 99 is used. The region 139A is the output region unless the polarizer 99 is not used, in which case the output region is the region 139. As shown in FIG. 5C, the orientation of the polarizer 99, if used, would have to be rotated by 90° relative to its orientation shown in FIGS. 5A and 5B to obtain the light in the output region 139A of the polarization shown. Therefore, in certain embodiments, the output polarizer 99, which is optional, would not be used.

Figure 5D:
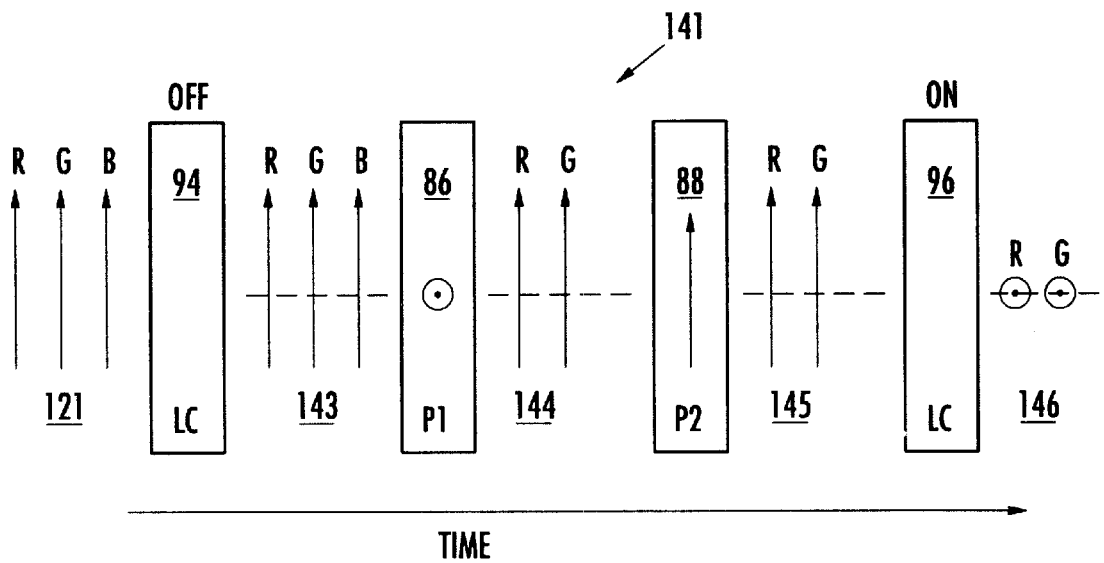

FIG. 5D illustrates an optical path 141 of the electro-optic shutter 80 in FIG. 4 when the first liquid crystal device 84 is in the FIRST state and the second liquid crystal device 90 is in the SECOND state. Since the first liquid crystal layer 94 is in the FIRST state, light is transmitted by the first liquid crystal layer 94 from the input region 121 without substantial polarization rotation. The second region 143 receives red, green, and blue light that has the initial polarization of light from the left region 121. The first color-selective layer 86 transmits substantially all the red and green light with the initial polarization and reflects substantially all the blue light with the initial polarization. The third region 144 in the optical path 141 receives the red and green light with the initial polarization. The second color-selective layer 88 transmits substantially all the red and green light with the initial polarization to the fourth region 145. Since the second liquid crystal layer 96 is in the SECOND state, it rotates the polarization of light incident thereon by about 90°. Thus, the region 146 of the optical path 141 receives the red and green light having a polarization substantially orthogonal to the initial polarization of the light in the input region 142. This red and green light is then received by the region 146A, if the polarizer 99 is used. The polarizer 99 would be oriented the same as in FIG. 5C to obtain the light in the output region 146A of the same polarization as shown in FIG. 5C. Again, in certain embodiments, the output polarizer 99, which is optional, would not be used. The region 146A is the output region unless the polarizer 99 is not used, in which case the output region is the region 146.

Figure 6A:
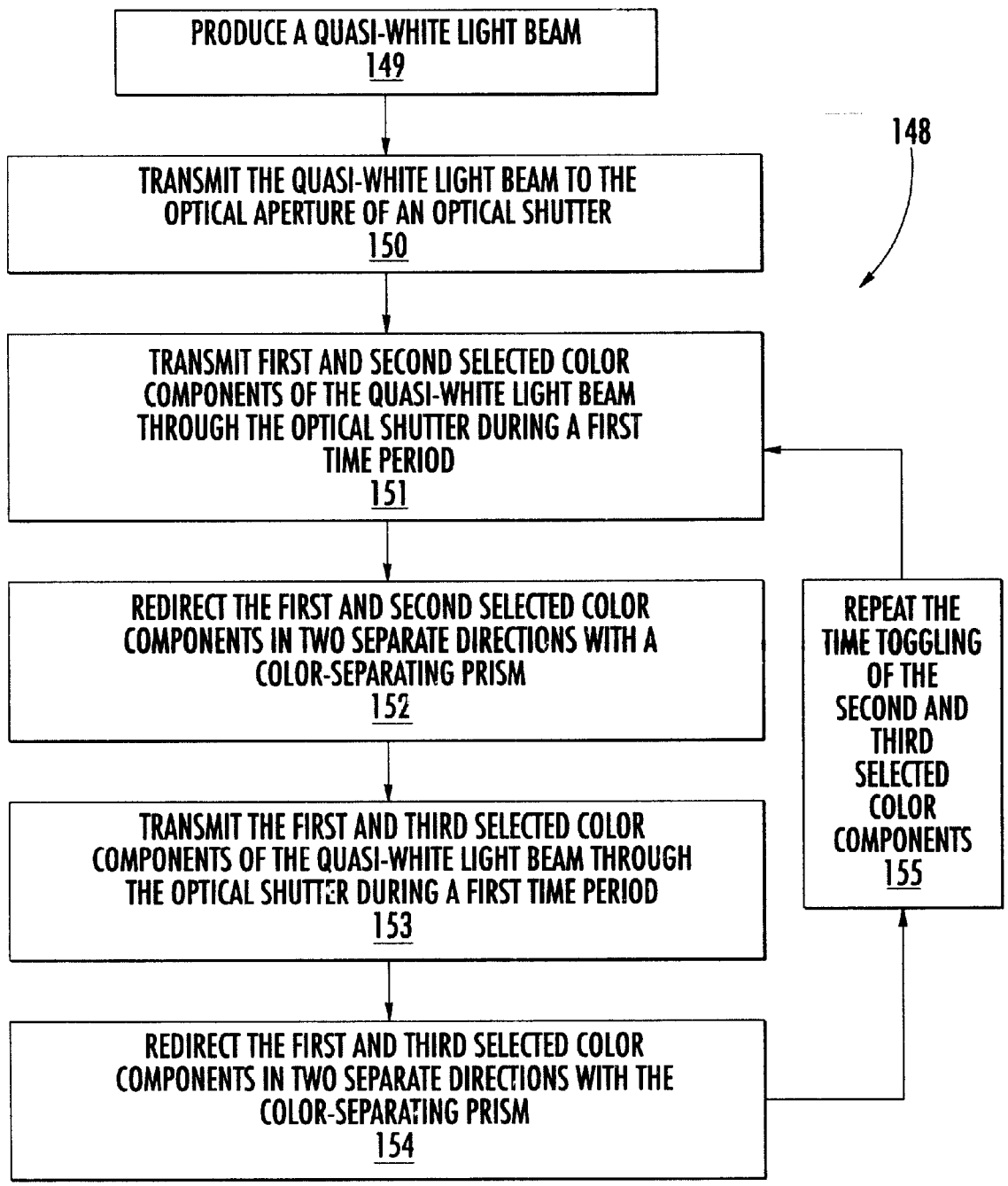
FIG. 6A is a flowchart illustrating a first method of operating the electro-optic system in FIG. 2 in accordance with an embodiment of the invention.

FIG. 6A is a flowchart illustrating a method 148 for operating the electro-optic system 40 in FIG. 2 in accordance with an embodiment of the invention. The method 148 can increase the time averaged intensity of a first color component with respect to the intensities of second and third color components. At block 149, the light source 44 produces the quasi-white light beam 42. At block 150, the quasi-white light beam 50 is transmitted to an aperture of an optical shutter, e.g., the electro-optic shutter 48 in FIG. 2. At block 151, the optical shutter is in the FIRST state and transmits the first and second selected color components of the quasi-white light beam 50 during a first time period. At block 152, the color-separating prism 54 redirects the first and second selected color components in two separate directions. At block 153, the optical shutter is in the SECOND state and transmits the first and third selected color components of the quasi-white light beam 50 during a second time period. At block 154, the color-separating prism 54 redirects the first and third selected color components in two separate directions. At block 155, the state of the optical shutter returns to block 151 to repeat the time toggling of the second and third selected color components in the quasi-white light beam 50 by toggling between the SECOND and FIRST states.

Figure 6B:
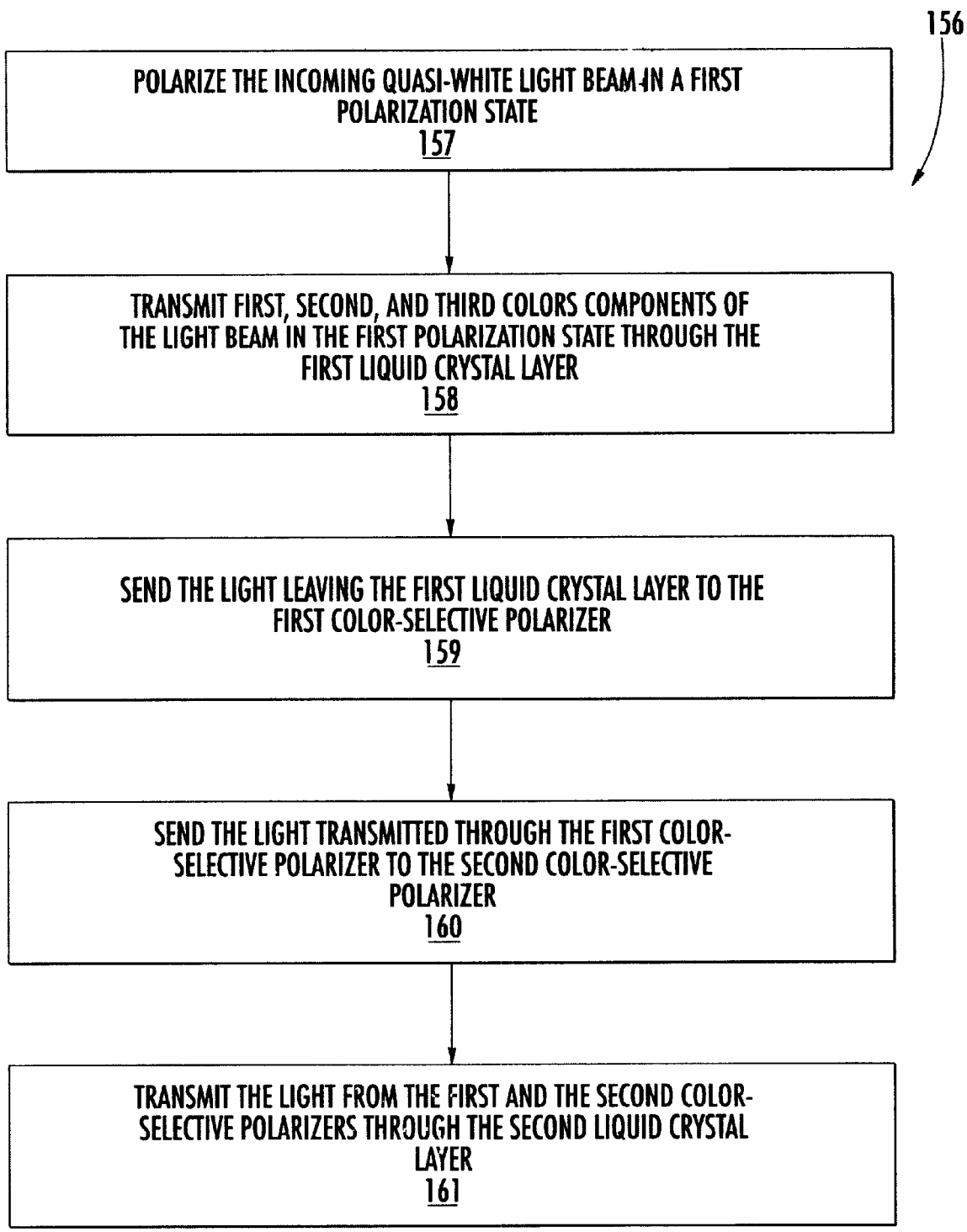
FIG. 6B is a flowchart illustrating a second method of operating the electro-optic shutter in FIG. 3 in accordance with an embodiment of the invention.

FIG. 6B is a flowchart illustrating a method 156 of operating the electro-optic shutter 80 in FIG. 3 in accordance with an embodiment of the invention. At block 157, the polarizer 82 polarizes the incoming quasi-white light beam 50 in a first linear polarization. At block 158, first, second, and third colors components in the first polarization are transmitted through the first liquid crystal layer 94. At block 159, the light transmitted through the first liquid crystal layer 94 is sent to the first color-selective layer 86. At block 160, the light transmitted through the first color-selective layer 86 is sent to the second color-selective layer 88 (blocks 159 and 160 could be embodied in one filter). At block 161, the light transmitted through both the first and the second color-selective layers 86, 88 is transmitted through the second liquid crystal layer 96.

The method 148 includes toggling the first and second liquid crystal layers 94, 96 between the SECOND and the FIRST states. The liquid crystal layers 94, 96 can toggle between the FIRST and SECOND states with very short transition times as compared to a mechanical shutter. However, a mechanical shutter (not shown) could replace the electro-optic shutter 48 in FIG. 2 in accordance with an alternative embodiment of the invention. The mechanical shutter may be a rotating mirror with several different dichroic reflective faces. The rotating mirror would time toggle between different colored light beams by aligning the different dichroic reflective faces with the quasi-white light beam 50 in FIG. 2 during the first and second time periods. Nevertheless, the rotating mirror would have the faces misaligned, i.e. be in a transition state, during a much larger fraction (i.e., dead time) of the operating cycle than the rapidly switching liquid crystal layers 94, 96 in FIG. 4.

Figure 7:
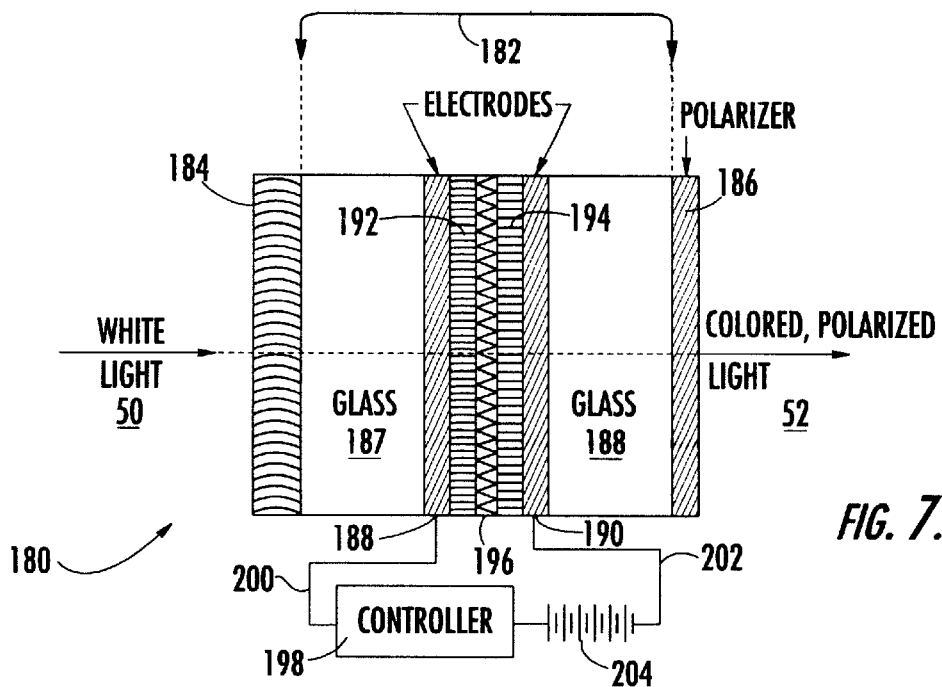
FIG. 7 illustrates the electro-optic shutter in FIG. 2 in accordance with a second embodiment of the invention.

FIG. 7 illustrates a second embodiment 180 of the electro-optic shutter 48 in FIG. 2. The electro-optic shutter 180 includes a liquid crystal device 182, a color-selective layer 184, and a polarizer 186. Other embodiments could be envisioned by those skilled in the art with the benefit of the present disclosure. For example, in some embodiments, there is no polarizer 186, in which case, a subsequent system can make use of polarized and/or unpolarized light obtainable from the output of the electro-optic shutter 180. In the embodiment shown in FIG. 7, the color-selective layer 184 is fixedly attached to a first outer surface of the liquid crystal device 182, although the layer 184 and the polarizer 186 need not be attached to the liquid crystal device 182. The polarizer 186 is attached to a second outer surface of the liquid crystal device 182. The polarizer 186 is not color-selective and transmits polarizations parallel to an intrinsic optical axis. An intrinsic optical axis of the color-selective layer 184 and the intrinsic optical axis of the polarizer 186 are aligned. The color-selective layer 184, the liquid crystal device 182, and the polarizer 186 form a sandwich-type structure that processes the incoming "unpolarized" white (or quasi-white) light beam 50 to produce the outgoing colored and polarized light beam 52.

The polarizer 186 can be an absorptive linear polarizer. In accordance with alternative embodiments of the invention, the polarizer 186 can instead be a reflecting linear polarizer (e.g., MOF), as described above for the alternative embodiments of the polarizer 82 in FIG. 4, the polarizer portions of the color-selective layers 86, 88 in FIGS. 4–5D, and the optional polarizer 99 in FIGS. 5A–5D. The polarizer 186, when a reflecting linear polarizer (i.e., when substantially nonabsorptive), can also be used for optical pumping by reflecting unwanted polarizations or colors back to appropriate input light sources that can re-use the energy. The polarizer 186, when a reflecting linear polarizer, can reduce or prevent detrimental thermal effects that may be possible due to the use of high power light sources, as discussed similarly above for the polarizer 82. The electro-optic shutter 180 is, therefore, bi-directional for the unwanted light in certain embodiments.

As shown in FIG. 7, one embodiment of the liquid crystal device 182 has a sandwich form with an outer pair of glass plates 187, 188 providing structural rigidity. First and second transparent electrodes 189, 190 attach to the inner surfaces of the pair of glass plates 187, 188. In some embodiments, the transparent electrodes 189, 190 may be constructed of ITO. Two transparent layers 192, 194, e.g., polymer layers, are positioned between the transparent electrodes 189, 190. In the above-mentioned embodiment, the transparent polymer layers 192, 194 are constructed of polyimide. The two polymer layers 192, 194 contain and isolate a liquid crystal layer 196 from the external layers of the liquid crystal device 182, in similarity to the layers 115, 116 and 117, 118 in FIG. 4. The liquid crystal layer 196 behaves as or approximately as a ½ plate for the selected wavelength or color ranges and may be constructed from the liquid crystal materials described above for the liquid crystals 94, 96 (FIGS. 4–5D), for example, from the group consisting of ferroelectric liquid crystals and nematic liquid crystals. The liquid crystal layer can be similar to the liquid crystal layers 94, 96 of FIGS. 4–5D. A controller 198 has first and second lines 200, 202 that electrically connect to the first and second transparent electrodes 189, 190. The controller 198 applies a voltage of a source 204 across the transparent electrodes 189, 190 to change the state and optical properties of the liquid crystal layer 196. The liquid crystal device 182 and the liquid crystal layer 196 have two states, i.e., the above-described SECOND and FIRST states of the liquid crystal devices 84, 90 in FIG. 4. The electro-optic shutter 180 converts the incoming quasi-white light 50 into the outgoing polarized light 52 whose color is a function of the state of the liquid crystal device 182.

Referring to FIG. 7, the color-selective layer 184 acts as a color and polarization-dependent filter. The color-selective layer 184 transmits both polarizations of light in a first wavelength range, a first polarization of light in a second wavelength range, and a second polarization of light in a third wavelength range. The second polarization is substantially orthogonal to the first polarization. The first polarization is along the intrinsic optical axis (not shown) of the color-selective layer 184. In the below-described embodiments, the first, second, and third wavelength ranges correspond to red, green, and blue light, respectively, but other embodiments of the color-selective layer 184 employ other substantially non-overlapping wavelength ranges for the first, second, and third wavelength ranges. The manufacture of the color-selective layer 184 from, for example, cholesteric liquid crystal layers is known in the art. The polarization of green light transmitted by the layer 184, e.g., a cholesteric layer, is parallel to the intrinsic optical axis. Cholesteric layers with preselected wavelength ranges can be obtained from Rolic Ltd., Postfach 3255, Basel Switzerland CH-4002 and other manufacturers. The color-selective layer 184 could also be manufactured with retardance films and not cholesteric thin-films.

Figure 8A:
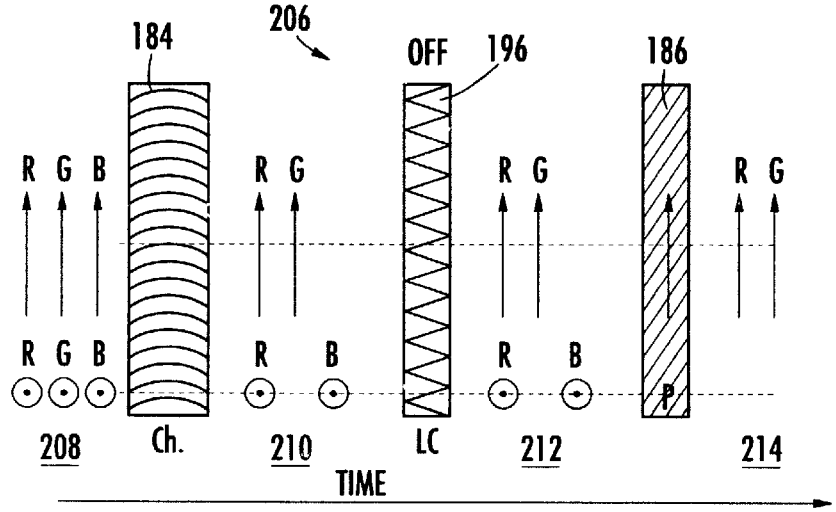
FIGS. 8A–8B illustrates how the electro-optic shutter in FIG. 7 separates incoming light into beams of different colors.

FIG. 8A illustrates an exemplary optical path 206 through the electro-optic shutter 180 when the liquid crystal device 182 is in the FIRST state in accordance with an embodiment of the invention. In the input region 208, incoming unpolarized light of red, green, and blue colors enters the optical path 206. The color-selective layer 184 transmits both polarizations of the red light, a first polarization of the green light, and a substantially orthogonal polarization of the blue light to a second region 210. Since the liquid crystal layer 196 is in the FIRST state, it transmits the light from the second region 210 to a third region 212 without a polarization rotation. The polarizer 186 transmits to an output region 214 of the optical path 206 the red light of polarization parallel to the intrinsic optical axis of the polarizer 186 and the green light of the first polarization as discussed above.

Figure 8B:
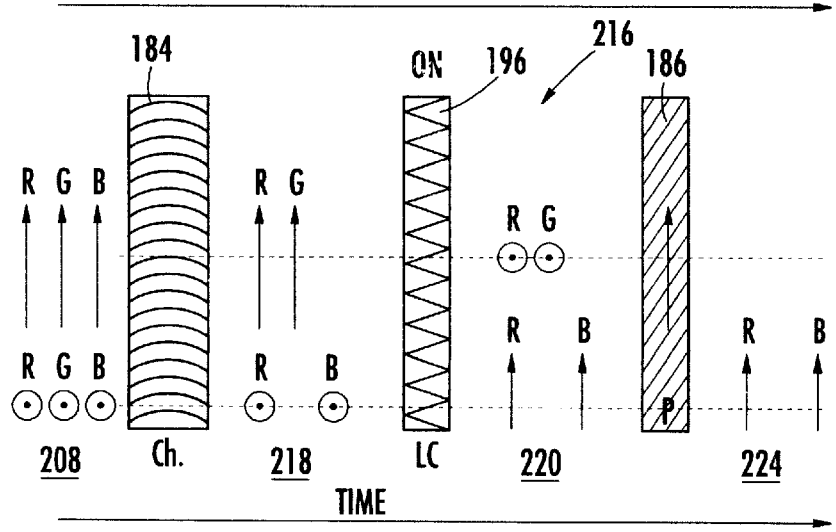

FIG. 8B illustrates an optical path 216 of the electro-optic shutter 180 in FIG. 7 when the liquid crystal device 182 is in the SECOND state. Again, the color-selective layer 184 transmits both polarizations of red light, the first polarization of green light, and a substantially orthogonal polarization of blue light to a second region 218 of the optical path 216. Since the liquid crystal layer 196 is in the SECOND state, it rotates the polarization of light transmitted from the second region 218 to a third region 220 by about 90°. The third region 220 receives the red light of both polarizations, the green light of the orthogonal polarization, and the blue light of the first polarization. Again, the polarizer 186 only transmits polarizations parallel to its intrinsic optical axis to the output region 224. Therefore, the red and blue light are transmitted to the output region 224 in the optical path 216 in response to the liquid crystal device 182 being in the SECOND state.

In the FIRST state, the electro-optic shutter 180 in FIG. 7 transmits red and green light, and, in the SECOND state, the electro-optic shutter 180 transmits red and blue light. In both states, the incoming quasi-white light beam 50 is unpolarized and the outgoing light beam 52 has a linear polarization that does not depend on whether the liquid crystal device 182 is in the SECOND or the FIRST state. However, in various embodiments, the electro-optic shutter 180 is designed to produce different colors in the outgoing light beam 52 in response to being in the SECOND and FIRST states.

Figure 9:
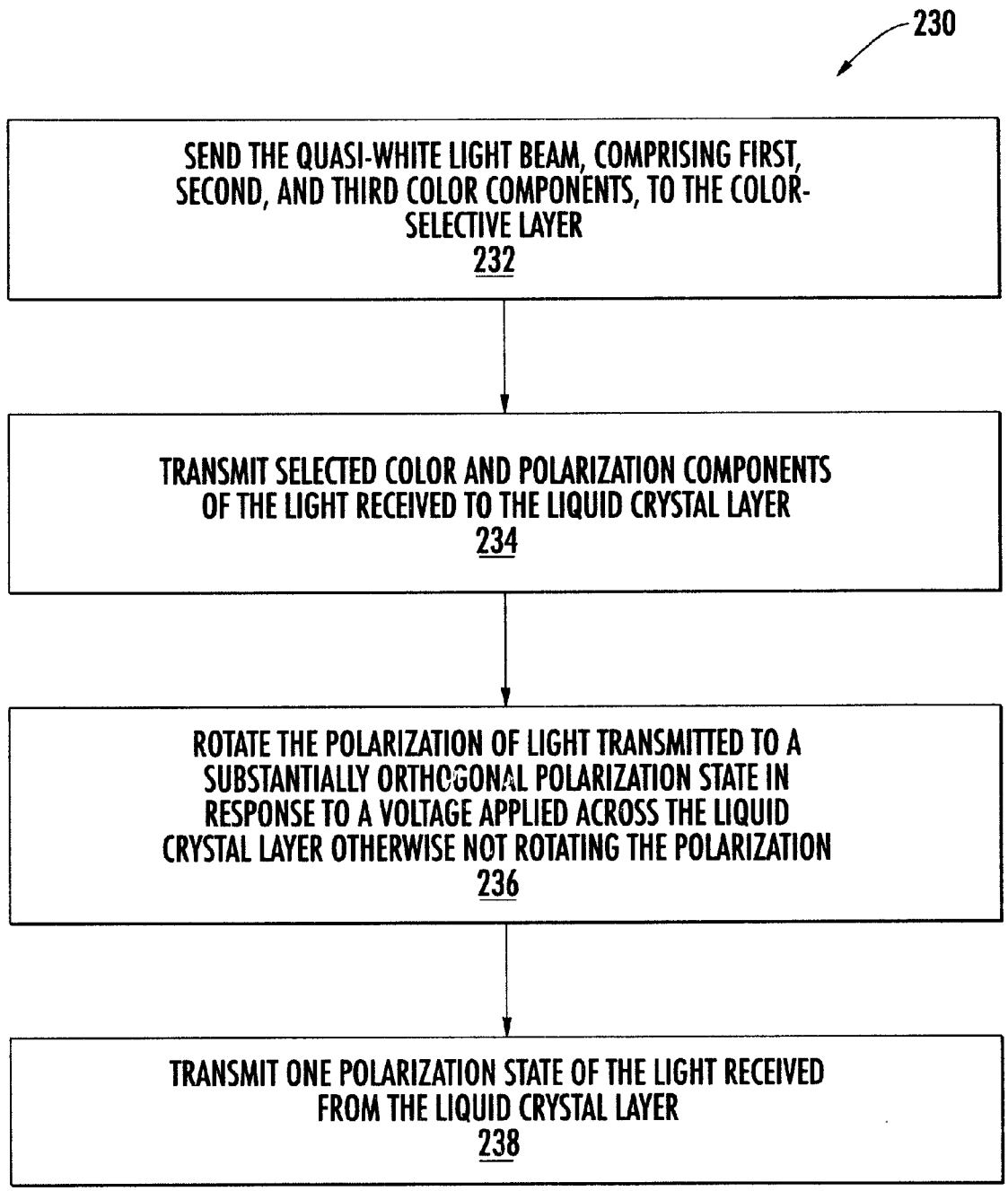
FIG. 9 is a flowchart illustrating a third method of operating the electro-optic shutter in FIG. 7 in accordance with an embodiment of the invention.

FIG. 9 is a flowchart illustrating the steps of a method 230 of operating the electro-optic shutter 182 in FIG. 7 in accordance with an embodiment of the invention. At block 232, the quasi-white light beam 50, comprising first, second, and third color components, is sent to the color-selective layer 184. At block 234, the color-selective layer 184 transmits selected color and polarization components of the light received to the liquid crystal layer 196. At block 236, in response to a voltage being applied across the liquid crystal layer 196, the liquid crystal layer 196 rotates the polarization of light received to a substantially orthogonal polarization, i.e. the liquid crystal 196 is in the SECOND state. The liquid crystal 196 does not rotate or minimally rotates the polarization if the voltage is not applied, i.e. the liquid crystal 196 is in the FIRST state. At block 238, the polarizer 186 transmits a first polarization of the light received from the liquid crystal layer 196.

Further information on electro-optic devices, modulators, color-selective layers, and filters employing liquid crystal devices or displays, and their effects on light color and light polarization may be found in the aforementioned U.S. Pat. No. 5,751,384, PCT International Publication Nos. WO 97/43862 and WO 96/37806, and in U.S. Pat. No. 5,686,931, entitled "Device for Displaying Colors Produced By Controllable Cholesteric Color Filters," issued to Fünfschilling et al., which is incorporated by reference herein in its entirety.

Figure 10:
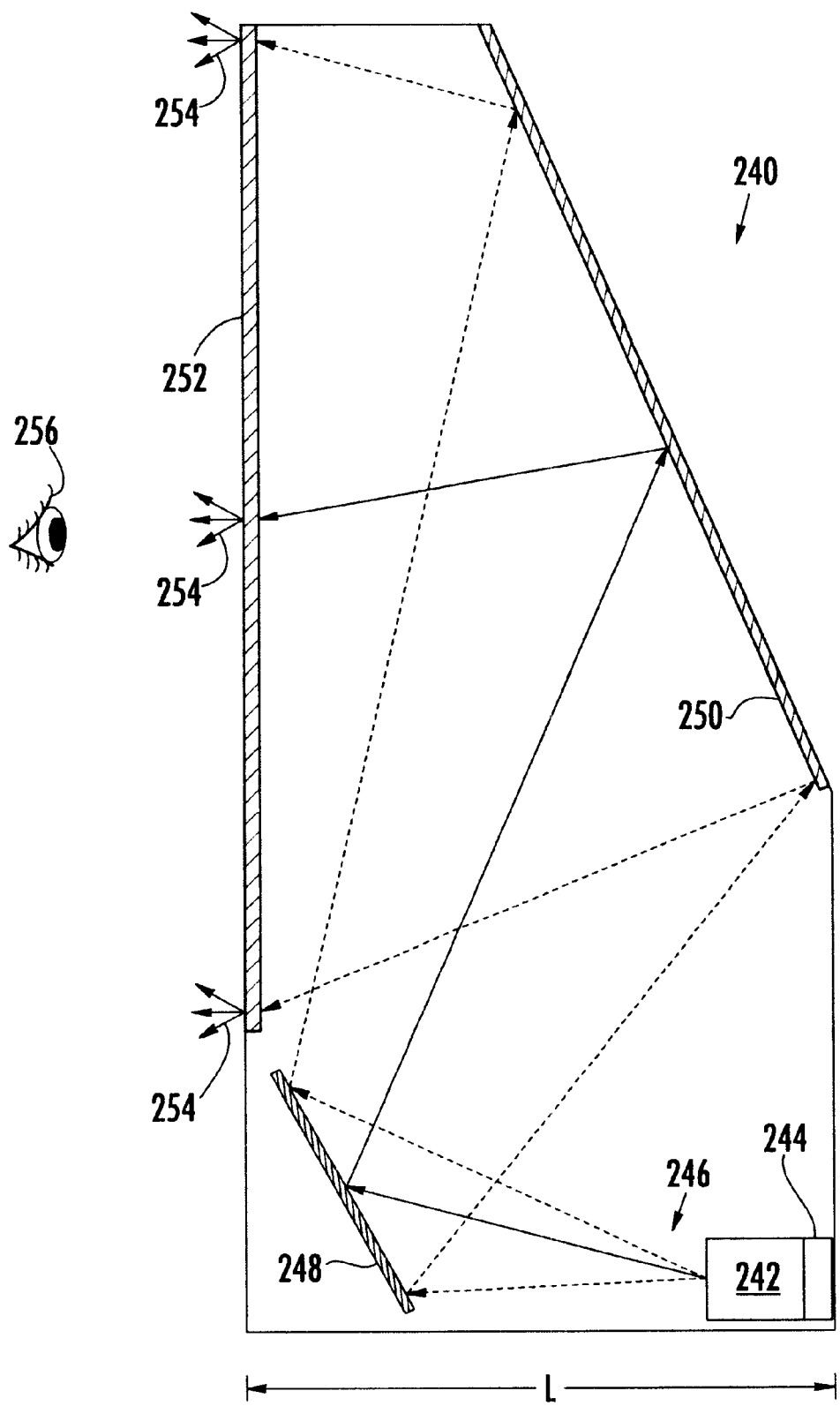
FIGS. 10 and 11 illustrate rear projection video systems in accordance with embodiments of the invention.

Projection systems can advantageously employ the electro-system 40 in FIG. 2 in accordance with embodiments of the invention. FIG. 10 illustrates a rear projection display system 240 similar to systems described in prior, co-owned U.S. patent application Ser. No. 08/581,108, filed Dec. 29, 1995, entitled "Projecting Images" and the aforementioned U.S. patent application Ser. No. 08/747,190, and in European Pat. application No. 96309443.8, EPO 783133A1, filed Dec. 23, 1996, also entitled "Projecting Images," published Jul. 9, 1997. U.S. patent application Ser. No. 08/581,108 and European Pat. application No. 96309443.8, EPO 78313A1 are incorporated by reference herein in their entirety. The system 240 may be used as part of or in a computer monitor or television display.

The display apparatus 240 includes an image engine 242. The image engine 242 may be similar to image engines described in prior, co-owned U.S. patent application Ser. No. 08/730,818, filed Oct. 17, 1996, entitled "Image Projection System Engine Assembly," which is incorporated by reference herein in its entirety. The image engine 242 includes an image source 244, which includes the quasi-white light source 44 that provides the incoming light beam 50 to the electro-optic shutter 48. The image source 244 outputs image light 246 in response to input signals, for example, electronic, video, or other signals received from an antenna, cable, computer, or controller (not shown). The image light 246 reflects off a lower mirror or reflector 248 to a higher mirror or reflector 250. The light 246 is then reflected by the upper mirror or reflector 250 and is directed to a screen 252. The screen 252 may be a diffusive screen or diffuser. The screen 252 scatters the image light 246 as light 254, which a viewer 256 can see as forming an image at the screen 252 of the display system 240.

Figures 11, 12:
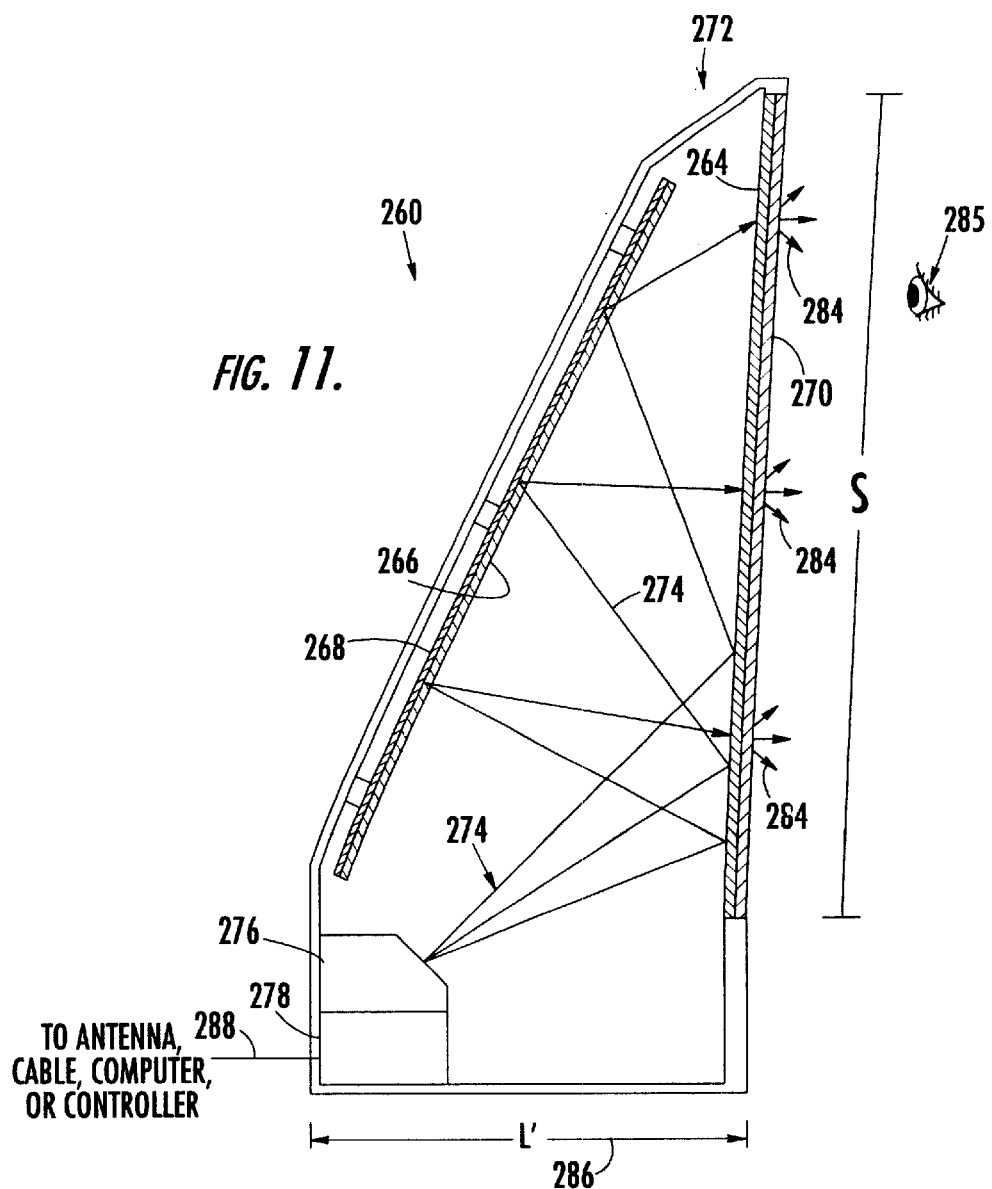
FIG. 12 is a blow-up view illustrating a portion of the rear projection video system in FIG. 11.

FIG. 11 illustrates another rear projection video system 260 in which the electro-optic system 40 in FIG. 2 can be advantageously employed, in accordance with an embodiment of the invention. The rear projection video system 260 is also similar to those described in the aforementioned U.S. patent application Ser. Nos. 08/581,108 and 08/880,178. The system 260 may also be used as part of or in a computer monitor or television display.

FIG. 12 is a blow-up of a portion 262 of the rear projection video system 260 in FIG. 11. The system 260 includes a linear reflecting polarizer 264, an achromatic retarder 266, a reflector 268, and a display screen 270 that form "folded" optics or optical train 272 for projecting an image on the display screen 270. The achromatic retarder 266 and the reflector 268 may be adjacent or held in spaced apart relation. A portion of light 274 from a light source 276 and an image source 278 reflects from the reflecting linear polarizer 264 of the folded optics 272 at one instance 280. It then passes through the achromatic retarder 266, where its polarization is rotated by substantially 45°, reflects from the reflector 268, and passes again through the achromatic retarder 266 with another substantially 45° polarization rotation. It then passes through the reflecting linear polarizer 264 and the display screen 270 at another instance 282 as light 284. The light 284 forms an image that can be seen by a viewer 285. Optical folding enables the system 260 to be shallow, i.e., to have a smaller footprint ("L'" in FIG. 11 and "L" in FIG. 10) 286, for an apparently larger projection distance than would be possible with some unfolded systems. Another way of saying this is that the ratio of the scteen size ("S" in FIG. 11) to footprint size ("S/L'") is large compared to some unfolded systems.

The image source 278 receives electrical signals through an input cable 288 and converts the signals into the primary image beam 274 with light incident (not shown) from the light source 276. The types of electrical signals used to create the primary image beam 274 may include television signals, such as those received by an antenna or over cable lines and processed by a video receiver (not shown), and computer video signals generated by a computer system (not shown). Audio signals may also be received from the input cable 288 and processed by a signal splitter and a sound system (not shown). The image source 278 may include any conventional image projection engine, such as a ferroelectric liquid crystal or other liquid crystal display (LCD) projector. The image source 278 must produce polarized light. A wide variety of other types of video systems employ polarization in image formation.

The light source 276 could be a light source disclosed in the aforementioned U.S. Pat. Nos. 5,404,076 and 5,606,220. Alternatively, the light source 276 could be a light source disclosed in the aforementioned U.S. patent application Ser. No. 08/747,190, or any other light source.

Figure 13:
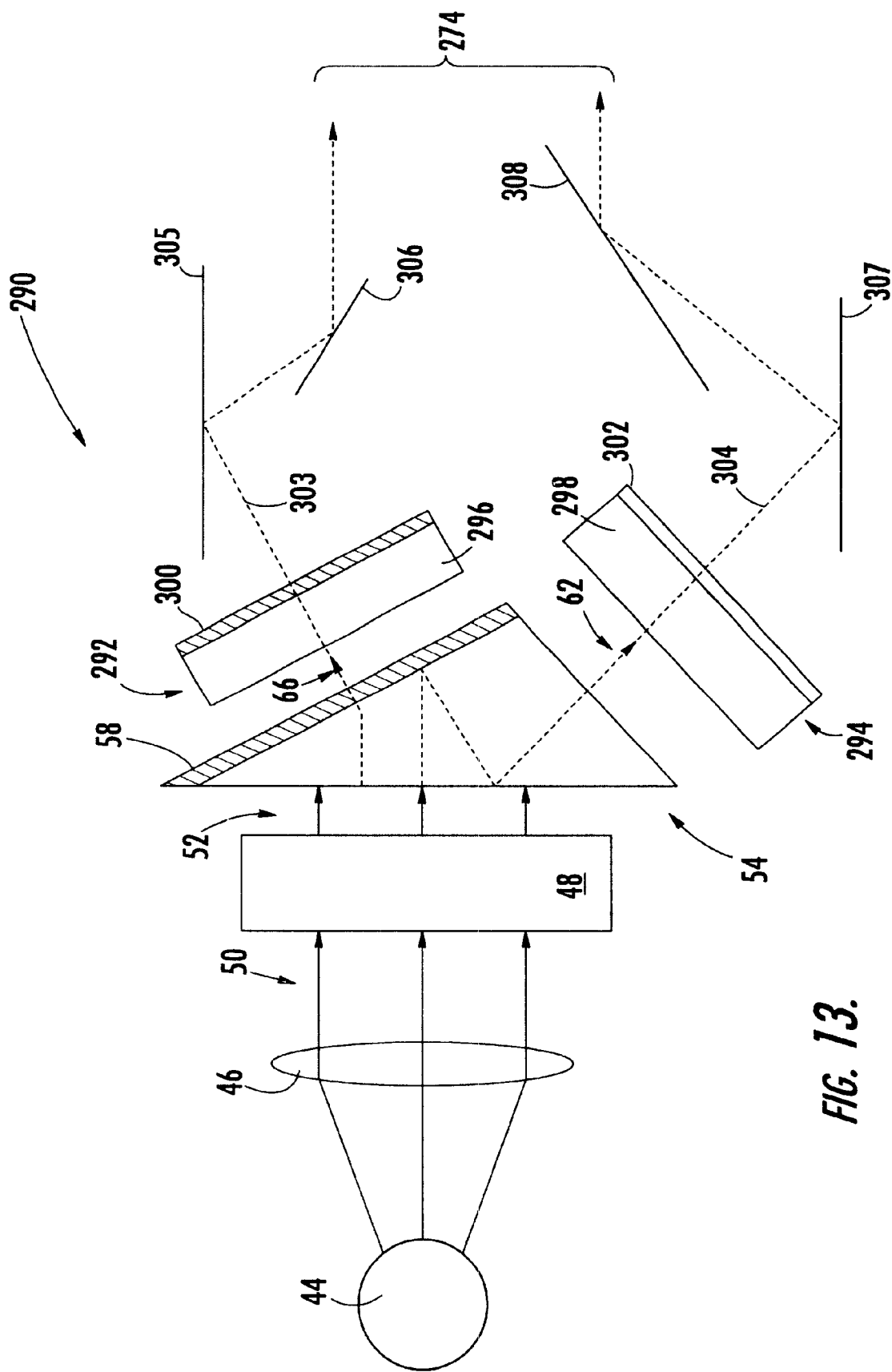
FIG. 13 illustrates an image source that can be used in the rear projection video systems in FIGS. 10 and 11 that can employ the electro-optic system in FIG. 2 in accordance with embodiments of the invention.

FIG. 13 illustrates an embodiment 290 of the image sources 244 or 278 that can employ the electro-optic system 40 in FIG. 2. The image source 290 includes the quasi-white light source 44 that provides the incoming light beam 50 to the electro-optic shutter 48. The light source 44 may be one of the light sources in the aforementioned U.S. Pat. Nos. 5,404,076 or 5,606,220 or in the aforementioned U.S. patent application Ser. Nos. 08/747,190 or 08/771,326. The electro-optic shutter 48 produces the colored and polarized outgoing light beam 52 that is further separated into color components by the prism 54. The colored beams 66, 62 from the prism 54 are incident on first and second transmissive imagers 292, 294. In one embodiment, the transmissive imagers 292, 294 are LCDs 296, 298 and polarizers 300, 302 that selectively transmit polarized image light in response to electric signals. The first and second transmissive imagers 292, 294 transmit portions of the colored beams 66, 62 to produce colored and polarized image beams 303, 304. A series of mirrors 305 and 306 redirects the colored image beam 304, which, along with the colored image beam 303, produces the primary image beam 246 or 274 in FIGS. 10 and 11, respectively. Other embodiments of the image sources 244 or 278 that use reflection imagers (e.g., LCD, ferro-electric LCD, or others) instead of transmissive imagers (likewise, e.g., LCD, ferro-electric LCD, or others) can also employ the electro-optic system 40 in FIG. 2.

The LCDs 296, 298 and polarizers 300, 302 operate as variable birefringent switches. The LCDs 296, 298 can be multi-pixel devices (not shown) with each pixel capable of being in a first or a second state. If one of the pixels is in the first state, incident light will be substantially unaffected by the pixel (i.e., polarization is not rotated). In the second state, however, the pixel will rotate the polarization of the incident light by about 90°. The light 303, 304 of rotated polarization that is transmitted by the particular pixel of the LCD 296, 298 will be filtered out by the polarizers 300, 302. The degree of polarization rotation is determined by the amount of voltage applied to the pixels in the LCDs 296, 298. Each pixel in the LCDs 296, 298 will, at any given instant during a video frame, be either in the first state or the second state, or in between. The filtering by the polarizers 298, 300 will thus depend on the degree of polarization rotation. The pixels of the LCDs 296, 298 may be electrically controlled, e.g., with television signals, electrical signals from a computer, via a controller or by other means, as discussed in the aforementioned U.S. patent application, Ser. No. 08/880,178.

The LCDs 296, 298 can operate as analog devices (e.g., nematic LCDs) in the sense that the amount of polarization rotation is related to the voltage level applied to each pixel. This allows the intensity in each pixel in the colored image beams 303, 304 to be individually adjusted. Alternately, the LCDs 296, 298 can operate as logic or bistable devices (e.g, ferroelectric LCDs) in the sense that each pixel is either in the first or second states discussed above. Then, the electrical control can perform frame-by-frame or intra-frame color and brightness modulation to produce different time-averaged colors and color brightnesses.

The particular embodiments disclosed above are specific only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An electro-optic shutter, comprising:
   first and second liquid crystal devices, each liquid crystal device adapted to rotate the polarization of incident light along an optical path to a substantially orthogonal polarization in response to being in a first state, and to not substantially change the polarization of the incident light in response to being in a second state;
   a first color-selective layer located between the first and second liquid crystal devices and adapted to transmit first and second polarizations of first and second colors, and transmit the first polarization of a third color and not the second polarization of the third color, wherein the first and second polarizations are substantially orthogonal to one another; and
   a second color-selective layer located between the first color-selective layer and the second liquid crystal device and adapted to transmit the first and second polarizations of the first color and the first polarization of the third color transmitted by the first color-selective layer and the second polarization of the second color transmitted by the first color-selective layer that is substantially orthogonal to the first polarization of the third color.

2. The electro-optic shutter as set forth in claim 1, wherein each liquid crystal device comprises a liquid crystal layer that changes from the first to the second state in response to application of a voltage.

3. The electro-optic shutter as set forth in claim 1, further comprising a polarizer located before the first and second liquid crystal devices in the optical path.

4. The electro-optic shutter as set forth in claim 3, wherein the polarizer comprises multilayer optical film.

5. The electro-optic shutter as set forth in claim 1, wherein the polarization axis of the polarizer is oriented to substantially transmit light in the first polarization.

6. The electro-optic shutter as set forth in claim 1, wherein the first liquid crystal device comprises:
   first and second glass plates;
   a first liquid crystal layer sandwiched between the first and second glass plates; and
   first and second transparent electrodes located on opposite sides of the liquid crystal layer.

7. The electro-optic shutter as set forth in claim 6, wherein the second liquid crystal device comprises:
   third and fourth glass plates;
   a second liquid crystal layer sandwiched between the third and fourth glass plates; and
   third and fourth transparent electrodes located on opposite sides of the second liquid crystal layer.

8. The electro-optic shutter as set forth in claim 7, further comprising a controller adapted to apply a second voltage across the second liquid crystal layer to transition the second liquid crystal layer between the first state and the second state.

9. The electro-optic shutter as set forth in claim 6, further comprising a controller adapted to apply a voltage across the first liquid crystal layer to transition the first liquid crystal layer between the first state and the second state.

10. The electro-optic shutter as set forth in claim 1, wherein the first and second color-selective layers comprise wavelength selective half-wave plates.

11. An apparatus comprising:
    a light source for producing light having first, second, and third color components, the first, second, and third color components being located in substantially non-overlapping wavelength ranges;
    an optical shutter for receiving the light and adapted to transmit the first color component and to toggle between transmitting the second and the third color components with the first color component during first and second preselected time periods; and
    a color-separating prism for receiving light from the optical shutter and adapted to send the first color component in a first direction and to send the second and the third color components in a second direction.

12. The apparatus as set forth in claim 11, wherein the color-separating prism is adapted to send the second and the third colors in the second direction and to send the first color in the first direction.

13. The apparatus as set forth in claim 11, further comprising a polarizer for receiving light from the light source and for producing light of the first polarization, the polarizer having a polarization axis.

14. The apparatus as set forth in claim 13, wherein the polarizer comprises multilayer optical film.

15. The apparatus as set forth in claim 11, wherein the optical shutter comprises an electro-optic shutter.

16. The apparatus as set forth in claim 15, wherein the electro-optic shutter comprises:

first and second liquid crystal devices adapted to rotate a polarization of incident light to a substantially orthogonal polarization in response to being in a first state and to not substantially rotate the polarization of the incident light in response to being in a second state; and a first color-selective layer located between the first and second liquid crystal devices and adapted to transmit first and second polarizations of the first and the second color components, and the first polarization of the third color component and not transmit the second polarization of the third color component, wherein the first and second polarizations are substantially orthogonal to one another.

17. The apparatus as set forth in claim 16, further comprising a second color-selective layer located between the first color-selective layer and the second liquid crystal device and adapted to transmit the first and the third color components, and a second polarization of the second color component transmitted from the first color-selective layer that is substantially orthogonal to the first polarization.

18. The apparatus as set forth in claim 17, wherein each of the liquid crystals devices comprises a liquid crystal layer, each liquid crystal layer changeable from the first to the second state in response to a voltage.

19. The apparatus as set forth in claim 17, wherein the first liquid crystal device comprises:

first and second glass plates;

a first liquid crystal layer sandwiched between the first and second glass plates; and first and second electrodes located on opposite sides of the liquid crystal layer.

20. The apparatus as set forth in claim 19, wherein the second liquid crystal device comprises:

third and fourth glass plates;

a second liquid crystal layer sandwiched between the third and fourth glass plates; and third and fourth electrodes located on opposite sides of the second liquid crystal layer.

21. The apparatus as set forth in claim 17, further comprising:

a controller adapted to apply a first voltage between said first and second electrodes to transition the first liquid crystal layer between the first state and the second states.

22. The apparatus as set forth in claim 21, wherein the controller is adapted to apply another voltage to transition the second liquid crystal layer between the first state and the second state.

23. The apparatus as set forth in claim 11, further comprising:

a color-selective layer adapted to transmit the first color component, a first polarization of the second color component, and a substantially orthogonal polarization of the third color component;

a liquid crystal device adapted to receive light from the color-selective layer and to rotate the polarization of light by substantially 90 degrees in response to being in a first state and to not substantially rotate the polarization of light in response to being in a second state; and a polarizer adapted to receive light from the liquid crystal layer and to transmit one linear polarization.

24. The apparatus as set forth in claim 23, wherein the color-selective layer comprises a cholesteric layer.

25. The apparatus as set forth in claim 23, wherein the color-selective layer comprises a retardation thin-film.

26. The apparatus as set forth in claim 23, wherein the liquid crystal device comprises a liquid crystal layer adapted to change from the first to the second state in response to application of a voltage.

27. The apparatus as set forth in claim 23, wherein the polarization axis of the polarizer is oriented substantially parallel to the first polarization.

28. The apparatus as set forth in claim 23, wherein the liquid crystal device comprises:

first and second glass plates;

a liquid crystal layer sandwiched between the first and second glass plates; and first and second electrodes located on opposite sides of the liquid crystal layer.

29. The apparatus as set forth in claim 28, further comprising a controller adapted to apply a voltage across the liquid crystal layer to transform the liquid crystal layer between the first state and the second state.

30. The apparatus as set forth in claim 28, wherein the first and second electrodes comprise transparent electrodes.

31. A method, comprising:

transmitting first, second and third color components of a first linear polarization of light through a first liquid crystal layer;

rotating the polarization of the light to a substantially orthogonal polarization in response to the first liquid crystal layer being in a first state;

sending light from the first liquid crystal layer to a first color-selective layer;

transmitting first and second polarizations of the first and second color components and the second polarization of the third color component and not transmitting the first polarization of the third color component from the first liquid crystal layer, the second polarization being substantial orthogonal to the first polarization, wherein the first and second polarizations are substantially orthogonal to one another;

sending light from the first liquid crystal layer to a second color-selective layer; and transmitting the first and second polarizations of the first and third color components, and transmitting the first polarization of the second color component and not transmitting the second polarization of the second color component from the first color-selective layer through the second color-selective layer.

32. The method as set forth in claim 31, wherein sending light to a second color-selective layer comprises sending light from the first color-selective layer.

33. The method as set forth in claim 31, wherein sending light to a first color-selective layer comprises sending light from the second color-selective layer.

34. The method as set forth in claim 31, wherein the first liquid crystal layer leaves the polarization of the first, second, and third colors of light substantially unchanged in the absence of being in the first state.

35. The method as set forth in claim 31, further comprising:

transmitting light from the first and the second color-selective layers through a second liquid crystal layer; and rotating the polarization of the light transmitted from the first and the second color-selective layers to a substantially orthogonal polarization in response to the liquid crystal layer being in first state.

36. The method as set forth in claim 31, further comprising rotating the polarization of light incident on the second liquid crystal layer to a substantially orthogonal polarization.

37. An electro-optic shutter, comprising:

a color-selective layer adapted to transmit first and second polarizations of a first color, the first polarization of a second color and not the second polarization of the second color, and the second polarization of a third color and not the first polarization of the third color, wherein the first and second polarizations are substantially orthogonal to one another;

a liquid crystal device adapted to receive light from the color-selective layer and to rotate the polarization of light to a substantially orthogonal polarization when in a first state and to not substantially rotate the polarization of light when in a second state; and a polarizer adapted to receive light from the liquid crystal layer and to transmit one linear polarization.

38. The electro-optic shutter as set forth in claim 37, wherein the color-selective layer comprises a cholesteric layer.

39. The electro-optic shutter as set forth in claim 37, wherein the liquid crystal device comprises a liquid crystal layer, the liquid crystal layer adapted to change between the first and the second states in response to a voltage.

40. The electro-optic shutter as set forth in claim 37, wherein the polarization axis of the polarizer is oriented substantially parallel the first polarization.

41. The electro-optic shutter as set forth in claim 37, wherein the liquid crystal device comprises:

first and second glass plates;

a liquid crystal layer sandwiched between the first and second glass plates; and first and second electrodes located on opposite sides of the liquid crystal layer.

42. The electro-optic shutter as set forth in claim 41, further comprising a controller adapted to apply a voltage for transitioning the liquid crystal layer between the first state and the second states.

43. The electro-optic shutter as set forth in claim 37, wherein the polarizer comprises multilayer optical film.

44. A method, comprising:

sending light to a color-selective layer, the light including first, second and third colors;

transmitting the first color, a first polarization of the second color, and a second polarization of the third color through the color-selective layer, the second polarization being substantially orthogonal to the first polarization;

rotating the polarization of the light from the color-selective layer to a substantially orthogonal polarization in response to receiving a first voltage and not substantially rotating the polarization in response to receiving a second voltage;

sending the light to a polarizer; and transmitting the first and third colors, and a first polarization of a second color through the polarizer.

45. The method as set forth in claim 44, wherein rotating comprises sending the light from the color-selective layer through a liquid crystal device to rotate the polarization of the light to a substantially orthogonal polarization in response to the first voltage, and to not substantially rotate the polarization of the light in response to the second voltage.

46. The method as set forth in claim 45, wherein transmitting through the color-selective layer comprises sending the light from the color-selective layer through a liquid crystal layer.

47. The method as set forth in claim 45, further comprising applying the first voltage across the liquid crystal device.

48. The method as set forth in claim 44, wherein sending light to the color-selective layer comprises sending unpolarized light to the color-selective layers.

49. The method as set forth in claim 44, wherein sending light to the color-selective layer comprises sending unpolarized light to a layer of cholesteric material.

50. The method as set forth in claim 44, wherein sending light to the color-selective layer comprises sending light to a retardance film.

51. An optical projection system, comprising:

a folded optical train for propagating image light;

an image source for projecting the image light into the folder optical train, the image source comprising a light source for producing light having first, second, and third color components, the first, second, and third color components being located in substantially non-overlapping wavelength ranges, and an optical shutter for receiving light from the light source and adapted to transmit the first color component and to toggle between transmitting the second and the third color components with the first color component during first and second preselected time periods.

52. The optical projection system as set forth in claim 51, further comprising a color-separating prism for receiving light from the optical shutter and adapted to send the first color component in a first direction, and to send the second and the third color components in a second direction.

53. The optical projection system as set forth in claim 51, wherein the folded optical train is comprised in part of a computer monitor.

54. The optical projection system as set forth in claim 51, wherein the folded optical train comprises an achromatic retarder located on a portion of a surface thereof, the achromatic retarder adapted to rotate the polarization of light incident thereon.

55. The optical projection system as set forth in claim 51, wherein the folded optical train comprises a linear reflecting polarizer located on a portion of a surface thereof.

56. The optical projection system as set forth in claim 51, further comprising a liquid crystal display located on a portion of a surface in the folded optical train.

57. The optical projection system as set forth in claim 51, wherein the electro-optic shutter comprises:

first and second light crystal devices, each liquid crystal device adapted to rotate the polarization of incident light to a substantially orthogonal polarization in response to being in a first state, and to not substantially change the polarization of incident light in response to being in a second state, a first color-selective layer located between the first and second liquid crystal devices and adapted to transmit first and second colors, and a first polarization of a third color, and a second color-selective layer located between the first color-selective layer and the second liquid crystal device and adapted to transmit the first and second polarizations of the first and the third colors and the second polarization of the second color and not the first polarization of the second color transmitted from the first color-selective layer that is substantially orthogonal to the first polarization.

58. The optical projection system as set forth in claim 57, wherein each liquid crystal device comprises a liquid crystal layer adapted to change between the first and the second states in response to application of a voltage.

59. The optical projection system as set forth in claim 57, wherein the first liquid crystal device comprises:

first and second glass plates;

a first liquid crystal layer sandwiched between the first and second glass plates; and first and second electrodes located on opposite sides of the liquid crystal layer.

60. The optical projection system as set forth in claim 59, wherein the second liquid crystal device comprises:

third and fourth glass plates;

a second liquid crystal layer sandwiched between the third and fourth glass plates; and third and fourth electrodes located on opposite sides of the second liquid crystal layer.

61. The optical projection system as set forth in claim 51, wherein the optical shutter comprises:

a color-selective layer adapted to transmit a first color, a first polarization of a second color, and a substantially orthogonal polarization of a third color;

a liquid crystal device adapted to receive light from the color-selective layer and to rotate the polarization of light to a substantially orthogonal polarization when in a first state and to not substantially rotate the polarization of light when in a second state; and a polarizer adapted to receive light from the liquid crystal layer and to transmit one linear polarization.

62. The optical projection system as set forth in claim 61, wherein the polarizer comprises multilayer optical film.

63. The optical projection system as set forth in claim 61, wherein the polarizer comprises one of a dichroic polarizer and a die polarizer.

64. The optical projection system as set forth in claim 61, wherein the color-selective layer comprises a cholesteric layer.

65. The optical projection system as set forth in claim 61, wherein the color-selective layer comprises a retardance layer.

66. The optical projection system as set forth in claim 61, wherein the liquid crystal device comprises a liquid crystal layer, the liquid crystal layer adapted to change between the first and the second states in response to a voltage.

67. The electro-optic shutter as set forth in claim 61, wherein the liquid crystal device comprises:

first and second glass plates;

a liquid crystal layer sandwiched between the first and second glass plates; and first and second electrodes located on opposite sides of the liquid crystal layer.

* * * * *